(12) United States Patent
Choudhury

(10) Patent No.: US 9,267,807 B2
(45) Date of Patent: Feb. 23, 2016

(54) IDENTIFYING CUSTOM RENDEZVOUS POINTS BETWEEN USERS AND VEHICLES PLYING ON CUSTOM ROUTES

(71) Applicant: TechnoMedia Software Solutions Private Limited, Bangalore (IN)

(72) Inventor: Joydeep Roy Choudhury, Bangalore (IN)

(73) Assignee: TechnoMedia Software Solutions Private Limited, Bangalore (IN)

(*) Notice: Subject to any disclaimer, the term of this patent is extended or adjusted under 35 U.S.C. 154(b) by 493 days.

(21) Appl. No.: 13/656,725

(22) Filed: Oct. 21, 2012

(65) Prior Publication Data

US 2013/0110396 A1    May 2, 2013

(30) Foreign Application Priority Data

Oct. 27, 2011 (IN) .......................... 3677/CHE/2011

(51) Int. Cl.
  *G01C 21/34* (2006.01)
  *G06Q 10/08* (2012.01)
  *G08G 1/123* (2006.01)

(52) U.S. Cl.
  CPC ............ *G01C 21/3438* (2013.01); *G06Q 10/08* (2013.01); *G08G 1/123* (2013.01)

(58) Field of Classification Search
  CPC ...... G01C 21/3438; G06Q 10/08; G08G 1/123
  USPC .................................... 701/300, 302; 705/330
  See application file for complete search history.

(56) References Cited

U.S. PATENT DOCUMENTS

| | | |
|---|---|---|
| 2006/0155460 A1* | 7/2006 | Raney ........................... 701/207 |
| 2012/0030133 A1* | 2/2012 | Rademaker ..................... 705/333 |
| 2013/0041941 A1* | 2/2013 | Tomasic et al. ................ 709/203 |
| 2013/0110396 A1* | 5/2013 | Choudhury ..................... 701/468 |
| 2014/0142840 A1* | 5/2014 | Spinelli et al. ................ 701/302 |

* cited by examiner

*Primary Examiner* — Mussa A Shaawat
*Assistant Examiner* — Thomas Ingram

(57) ABSTRACT

An aspect of the present invention facilitates identification of custom rendezvous points between users and vehicles plying on custom routes. In one embodiment, a system on board the vehicle receives notifications from users while the vehicle is plying/in transit on the custom route. The system determines the respective transit states (capturing the static and/or dynamic aspects) of the vehicle corresponding to the notifications. The system then inspects the transit states to identify the rendezvous points between the users and the vehicle plying on the custom route. The users by providing the notifications at different time instances (that is, when the vehicle is at different locations/points on the custom route) can cause different "custom" rendezvous points to be identified based on the preferences of the users using the vehicle.

17 Claims, 16 Drawing Sheets

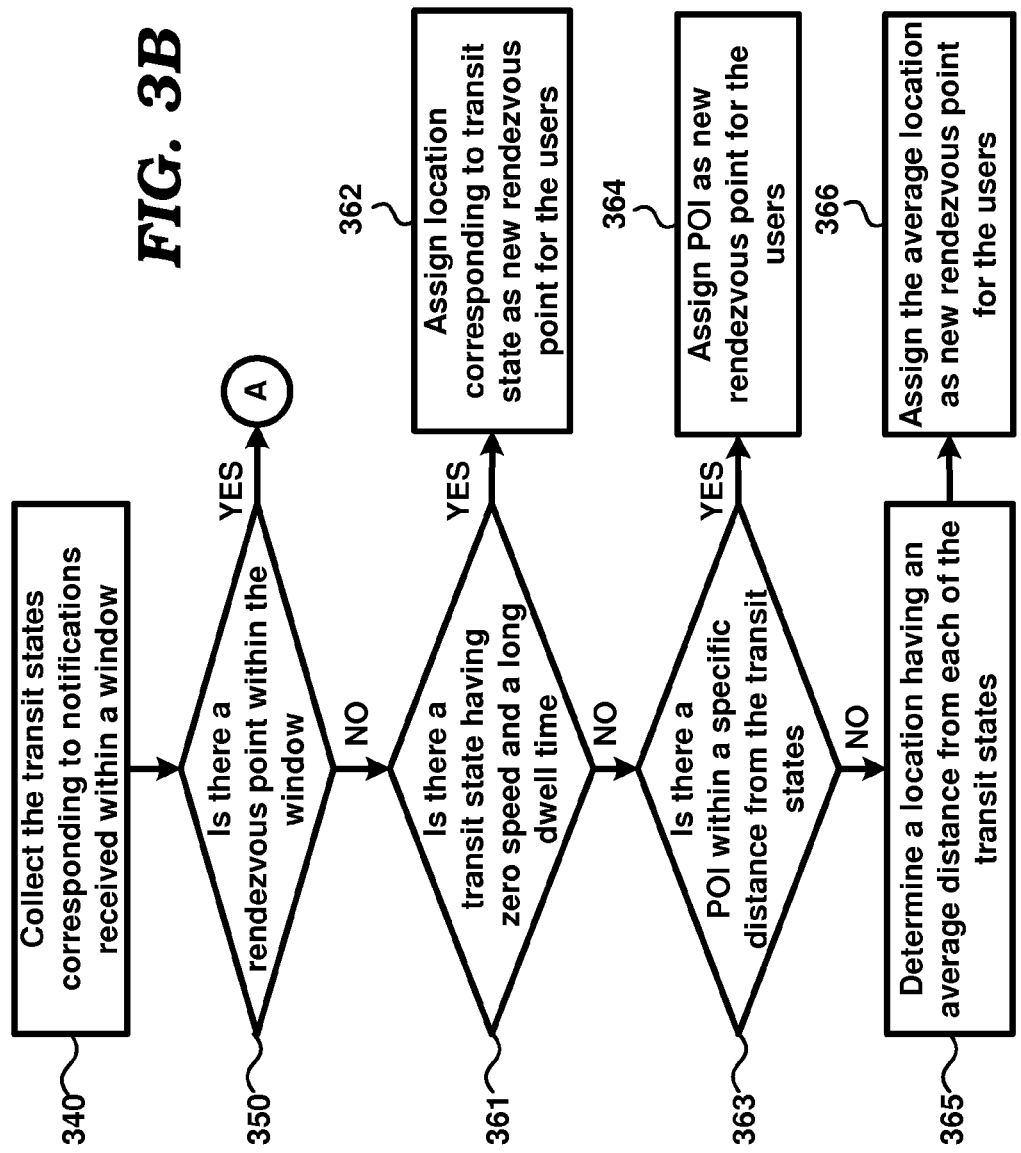

| | Time Of Notification | Longitude; Latitude | Route Distance | Bearing | Speed | Dwell Time | User ID |
|---|---|---|---|---|---|---|---|
| 531 → | 8:10:05 AM | 77.6685147;12.975487 | 3.730 km | 90 deg | 4 kmph | 1 sec | U01 |
| 532 → | 8:10:17 AM | 77.6686325;12.975396 | 3.747 km | 90 deg | 2 kmph | 1 sec | U02 |
| 533 → | 8:10:30 AM | 77.6686859;12.975437 | 3.752 km | 90 deg | 0 kmph | 20 sec | U03 |
| 534 → | 8:10:40 AM | 77.6688741;12.975462 | 3.773 km | 90 deg | 2 kmph | 1 sec | U04 |
| 535 → | 8:12:45 AM | 77.6656570;12.973252 | 5.09 km | 270 deg | 3 kmph | 1 sec | U05 |
| 536 → | 8:12:59 AM | 77.6634293;12.973253 | 5.34 km | 270 deg | 5 kmph | 1 sec | U06 |
| 537 → | 8:16:05 AM | 77.6598378;12.970176 | 6.23 km | 270 deg | 2 kmph | 1 sec | U07 |
| 538 → | 8:16:45 AM | 77.6600010;12.970169 | 6.25 km | 270 deg | 1 kmph | 1 sec | U08 |

FIG. 5B

| Name Of Point Of Interest | Longitude; Latitude |
|---|---|
| 571 → POI#1 | 77.6596298;12.970166 |
| 572 → POI#2 | 77.65883636;12.97169 |

FIG. 5E

| | 721 | 722 | 723 | 724 | 725 | 726 | 727 |
|---|---|---|---|---|---|---|---|
| 700 | Time Of Notification | Longitude; Latitude | Route Distance | Bearing | Speed | Dwell Time | User ID |
| 731 → | 8:10:04 AM | 77.6680298;12.97565 | 3.68 km | 90 deg | 0 kmph | 5 sec | U09 |
| 732 → | 8:10:40 AM | 77.6681747;12.9756765 | 3.68 km | 90 deg | 1 kmph | 1 sec | U10 |
| 733 → | 8:12:09 AM | 77.6654603;12.973378 | 5.17 km | 270 deg | 2 kmph | 1 sec | U11 |
| 734 → | 8:12:19 AM | 77.6654533;12.973462 | 5.19 km | 270 deg | 2 kmph | 1 sec | U12 |
| 735 → | 8:16:10 AM | 77.659788;12.970121 | 6.3 km | 270 deg | 2 kmph | 1 sec | U04 |

| | Time Of Notification | Longitude; Latitude | Route Distance | Bearing | Speed | Dwell Time | User ID |
|---|---|---|---|---|---|---|---|
| 931→ | 8:09:36 AM | 77.6649246;12.9738807 | 2.780 km | 90 deg | 0 kmph | 10 sec | U13 |
| 932→ | 8:09:47 AM | 77.6653519;12.9738445 | 2.784 km | 90 deg | 3 kmph | 1 sec | U14 |
| 933→ | 8:22:23 AM | 77.6600875;12.970355 | 9.023 km | 270 deg | 4 kmph | 1 sec | U15 |
| 934→ | 8:22:43 AM | 77.6597519;12.970310 | 9.027 km | 270 deg | 2 kmph | 1 sec | U16 |

IDENTIFYING CUSTOM RENDEZVOUS POINTS BETWEEN USERS AND VEHICLES PLYING ON CUSTOM ROUTES

BACKGROUND OF THE INVENTION

1. Technical Field

The present disclosure relates to transportation systems and more specifically to identifying custom rendezvous points between users and vehicles plying on custom routes.

2. Related Art

Vehicles are conveyances (such buses, cars, trains, aircrafts, etc.) used to transport people or goods from one place to another. A vehicle typically transports people/goods on a designated route containing one or more rendezvous/meeting points (e.g. bus stops, railway stations, airports, etc.) at which people/goods are loaded/unloaded from the vehicle. Typically, the rendezvous points and the designated route are pre-determined (e.g. a public transport vehicle), with the vehicle plying on the pre-determined designated route and rendezvousing with the users of the vehicle only at the pre-determined rendezvous points.

Custom routes are commonly used when the vehicle is shared among a smaller/fixed group of people (in comparison to the general public) for a specific purpose. Examples of vehicles that ply custom routes are a school bus that is shared by a group of students, a car pool that is shared by a group of commuters, and a shuttle service that is shared by employees of an organization. As the vehicle is shared by a fixed group of users, it may be desirable that the rendezvous points of the vehicle be based on the preferences of the individual users (referred to as "custom" rendezvous points), and not be pre-determined/pre-specified similar to that of public transport vehicles.

SUMMARY OF THE INVENTION

An aspect of the present invention facilitates identification of custom rendezvous points between users and vehicles plying on custom routes. In one embodiment, a system on board the vehicle receives notifications from users while the vehicle is plying/in transit on the custom route. The system determines the respective transit states (capturing the static and/or dynamic aspects) of the vehicle corresponding to the notifications. The system then inspects the transit states to identify the rendezvous points between the users and the vehicle plying on the custom route.

It may be appreciated that the rendezvous points are identified based on the transit states determined in response to the notifications received from the users. The users by providing the notifications at different time instances (that is, when the vehicle is at different locations/points on the custom route) can cause different rendezvous points to be identified. Accordingly, the present invention facilitates identification of "custom" rendezvous points based on the preferences of the users using the vehicle.

According to another aspect of the present invention, the inspecting of the transit states is performed using a set of windows. In one embodiment, the system collects the set of transit states corresponding to notifications received within a first window, determines whether there exists a custom rendezvous point within the first window and then processes the set of transit states according to a first manner if a custom rendezvous point exists within the first window and according to a second manner otherwise.

According to one more aspect of the present invention, in response to identifying that a set of transit states within a window are similar to the state of a first custom rendezvous point within the window, the system determines whether the users (who sent the notifications within the window) are already assigned to another custom rendezvous point. If the users are assigned to another custom rendezvous point, the system checks whether the users desire to board from the first custom rendezvous point and reassigns the users to the first custom rendezvous point if the users desire to board from the custom rendezvous point. If the users are not already assigned to another custom rendezvous point, the first custom rendezvous point is assigned to the users According to yet another aspect of the present invention, in response to identifying that a set of transit states within a window differ in bearing to the state of a first custom rendezvous point within the window, the system checking whether the users (who sent the notifications within the window) are agreeable to rendezvous with the vehicle at the first custom rendezvous point. If the users are agreeable, the first custom rendezvous point is assigned to the users. Otherwise, a new custom rendezvous point is assigned to the users.

According to another aspect of the present invention, in response to identifying that a set of transit states within a window differ in route distance to the state of a first custom rendezvous point within the window, a new custom rendezvous point is assigned to users.

According to one more aspect of the present invention, in response to determining that a window does not contain a custom rendezvous point and also identifying that there exists a first transit state in a set of transit states within the window that indicates the speed of the vehicle as zero and a dwell time greater than a pre-defined duration, the system assigns the GPS location of the first transit state as a custom rendezvous point for the users (who sent the notifications within the window).

According to yet another aspect of the present invention, in response to determining that a window does not contain a custom rendezvous point and also identifying that there exists a point of interest within a pre-defined distance from each of a set of transit states within the window, the system assigns the GPS location of the point of interest as a custom rendezvous point for the users (who sent the notifications within the window).

According to another aspect of the present invention, in response to determining that a window does not contain a custom rendezvous point, the system determines a location having an average distance from each of a set of transit states within the window and then assigns the average location as a custom rendezvous point for the users (who sent the notifications within the window).

Several aspects of the invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

BRIEF DESCRIPTION OF THE DRAWINGS

Example embodiments of the present invention will be described with reference to the accompanying drawings briefly described below.

FIG. 3B is a flowchart illustrating the manner in which custom rendezvous points between users and vehicles plying on custom routes are identified during initialize mode of operation according to an aspect of the present invention.

Figure 5A:
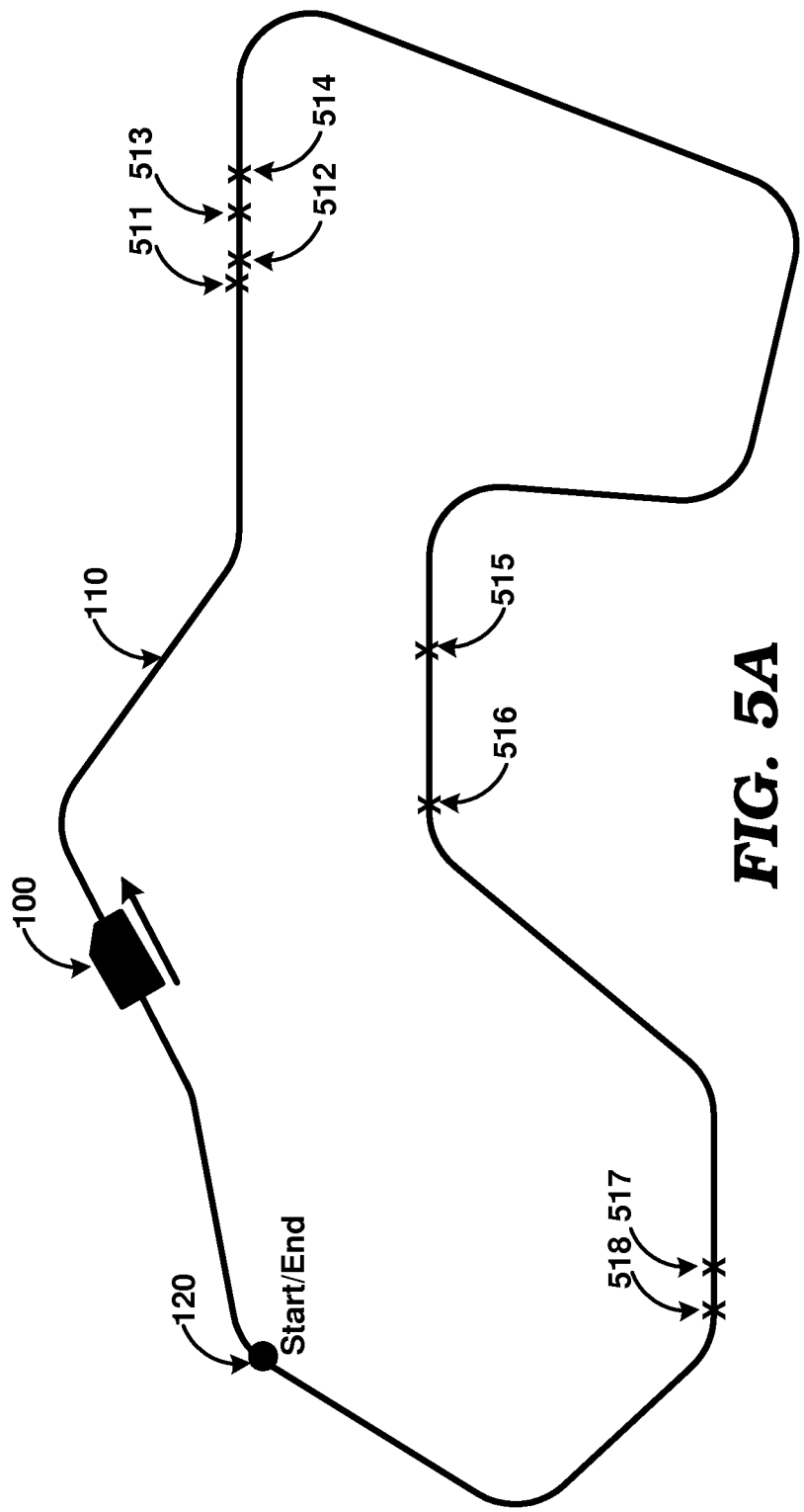
FIG. 5A illustrates the notifications received from registered users during initialize mode in one embodiment.
Figure 5C:
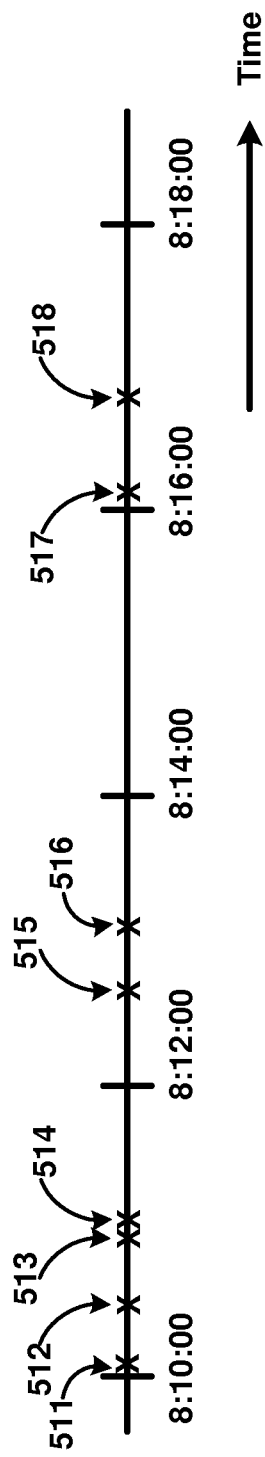
FIG. 5B illustrates the details of the transit states maintained corresponding to notifications received from registered users during initialize mode in one embodiment.
Figure 5D:
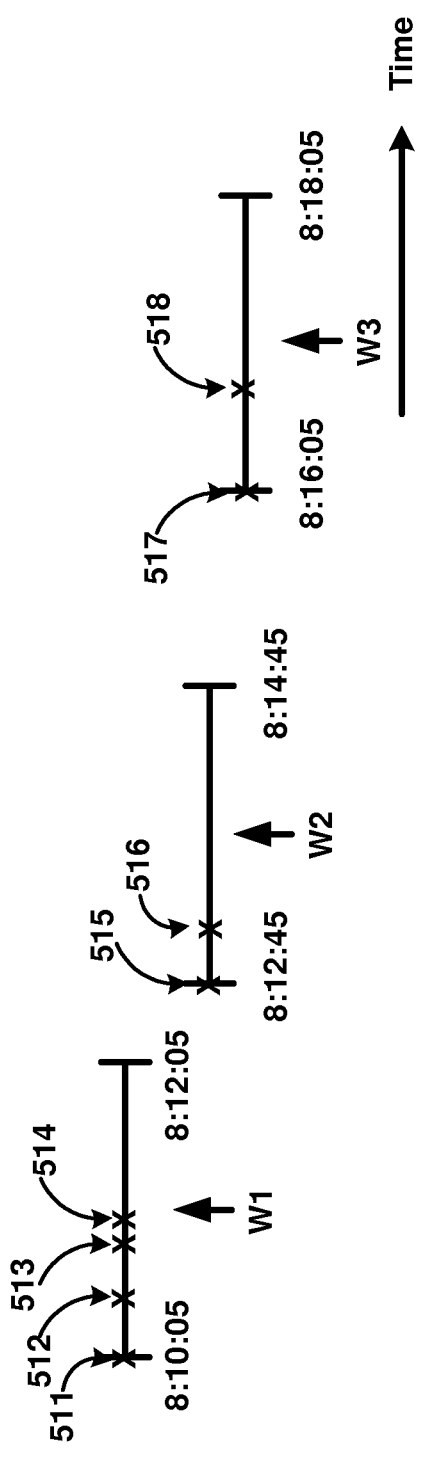

Each of FIGS. 5C and 5D illustrates a corresponding manner in which windows for collecting notifications (for processing together) are selected in one embodiment.

FIG. 5E illustrates the manner in which details of points of interest (POIs) are maintained in one embodiment.

Figure 6:
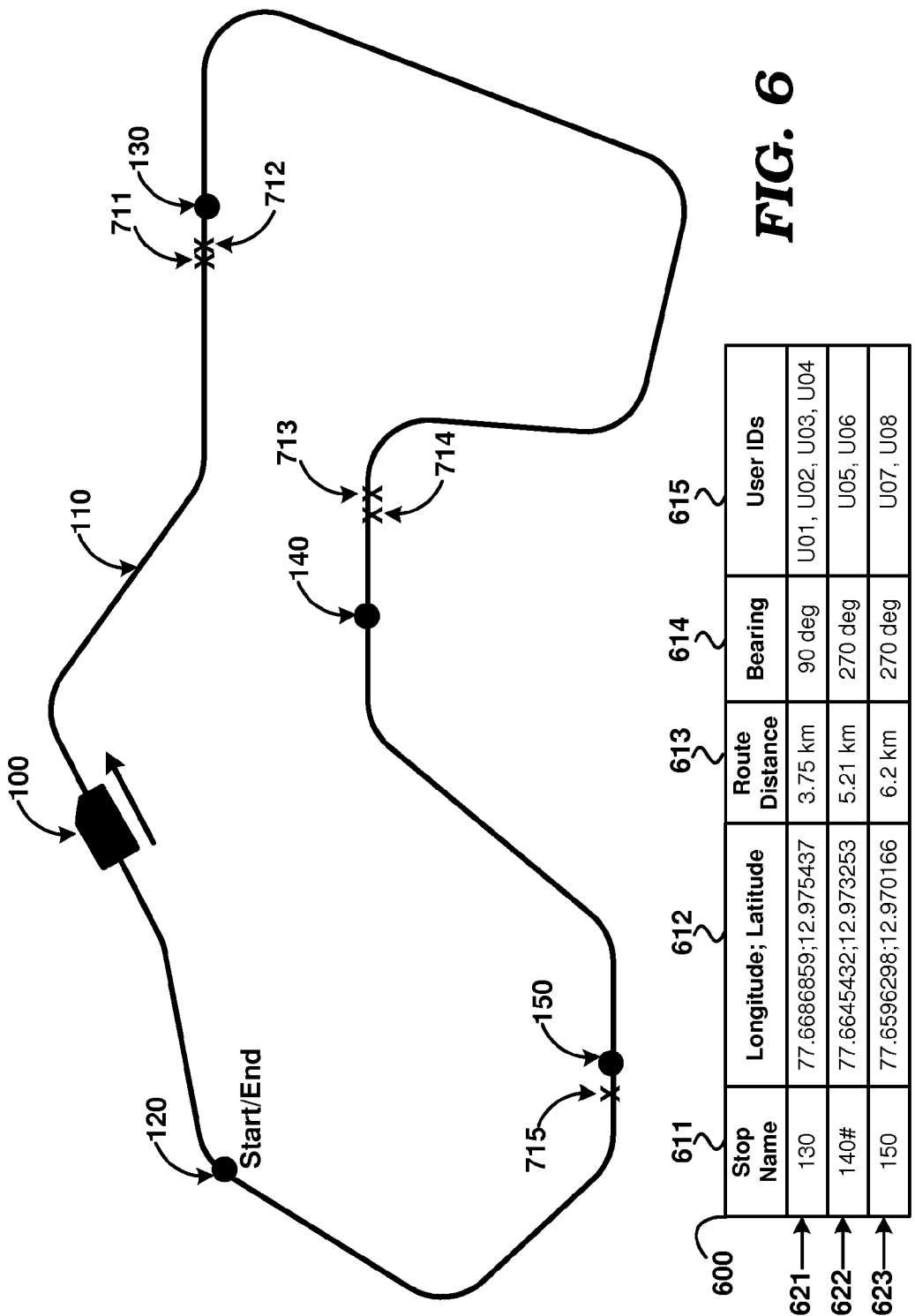

FIG. 6 illustrates custom rendezvous points identified during initialize mode (in particular, when there is no rendezvous point within the window) in one embodiment.

Figures 7A, 7B:
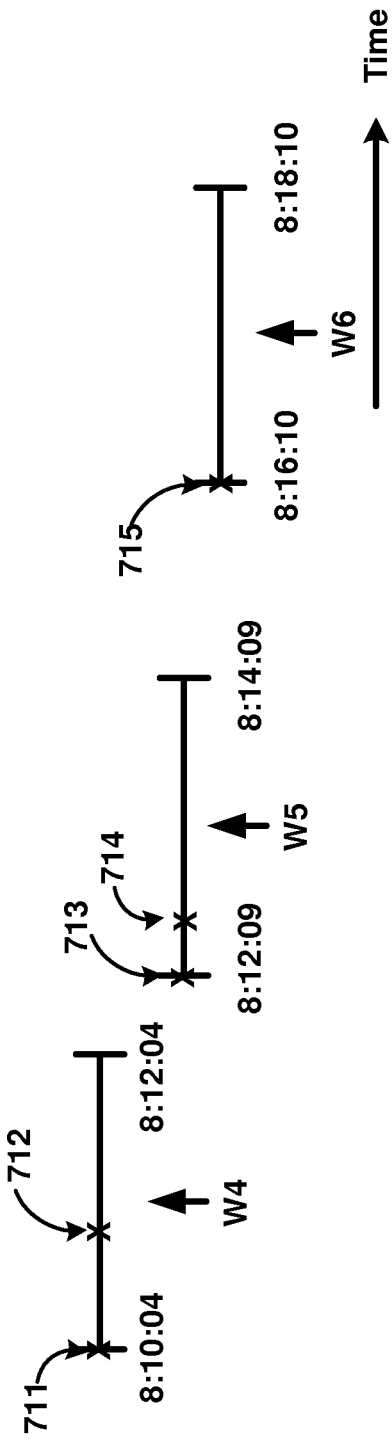

FIG. 7A illustrates the details of the transit states maintained corresponding to notifications received from registered users during normal mode in one embodiment.

FIG. 7B illustrates the windows used to process the notifications received during normal mode in one embodiment.

Figure 8:
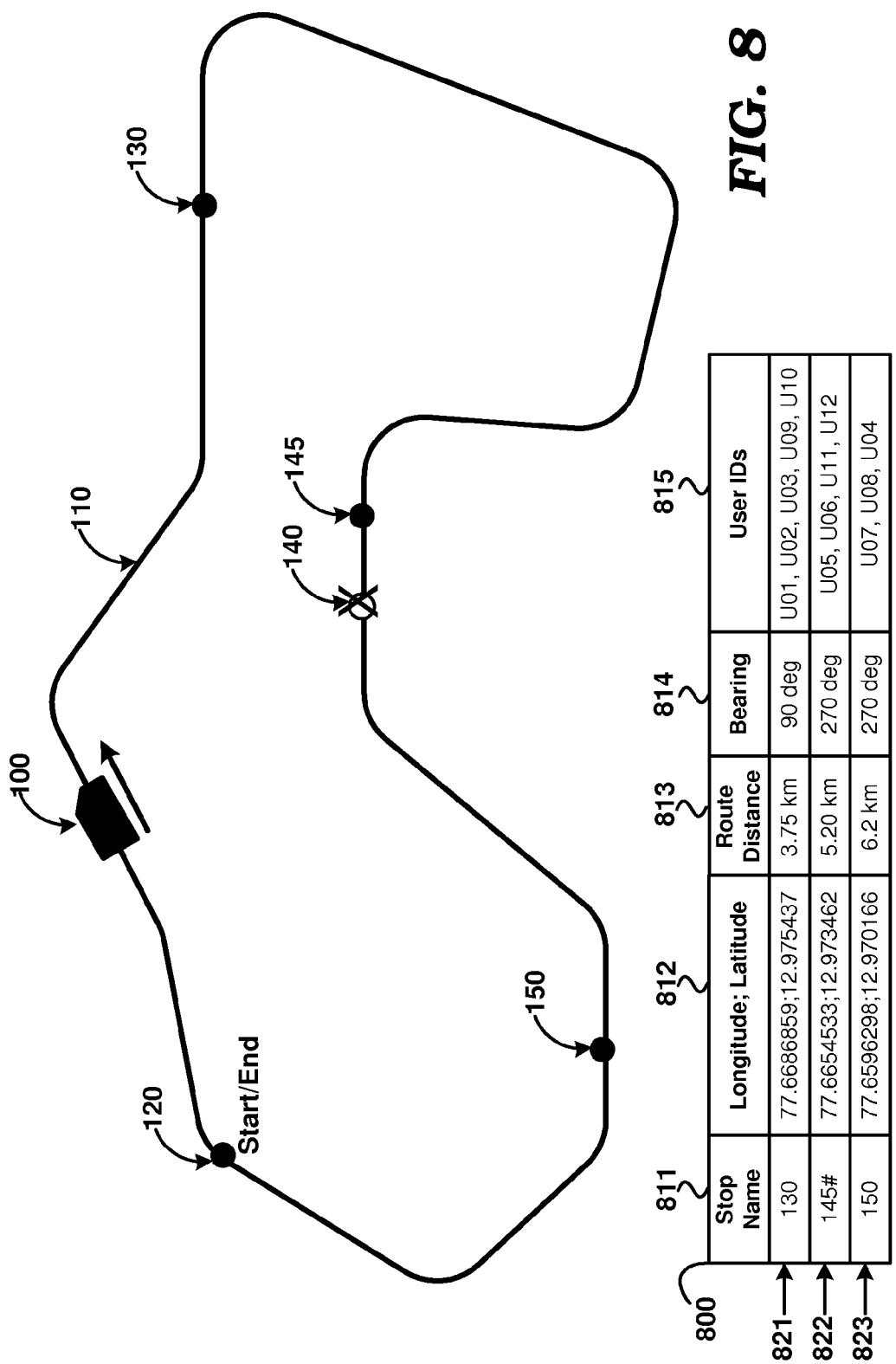

FIG. 8 illustrates the custom rendezvous points updated based on normal mode of operation in one embodiment.

Figure 9A:
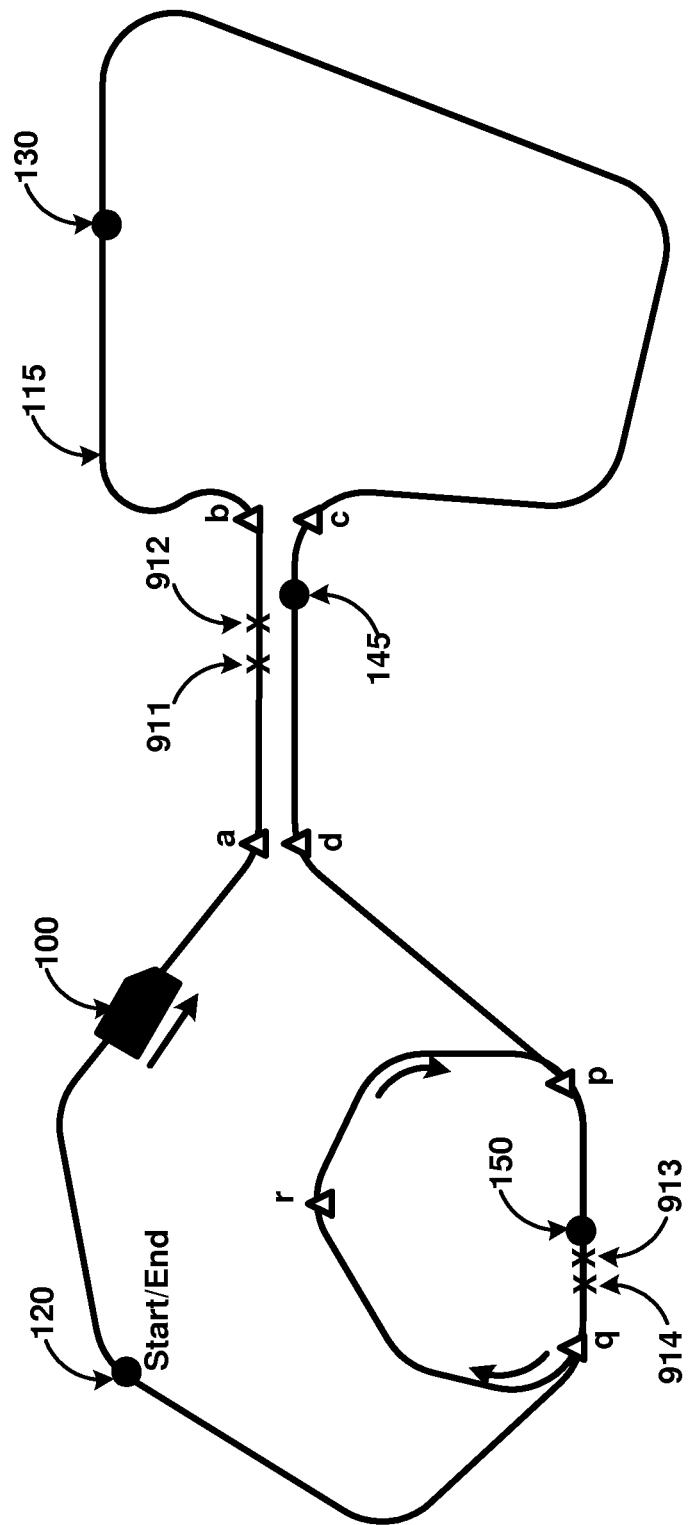

FIG. 9A is a block diagram depicting a vehicle plying another custom route in one embodiment.

Figures 9B, 9C:
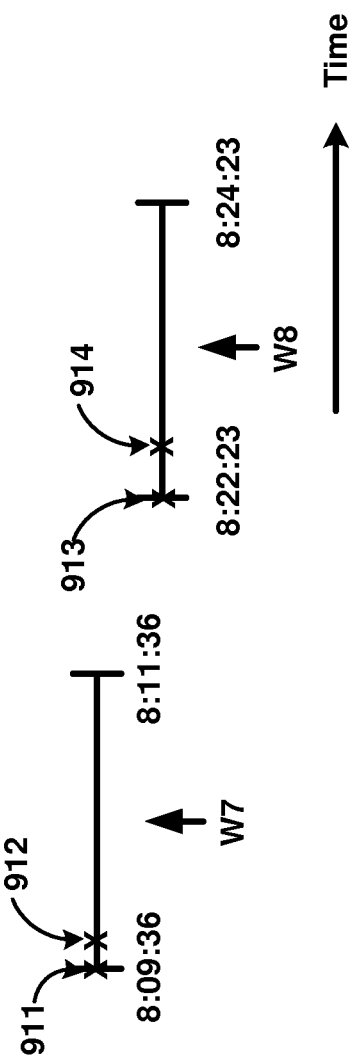

FIG. 9B illustrates the details of the transit states maintained corresponding to notifications received from registered users during normal mode of operation of a vehicle on another custom route in one embodiment.

FIG. 9C illustrates the windows used to process the notifications received during normal mode of operation of a vehicle on another custom route in one embodiment.

Figure 10:
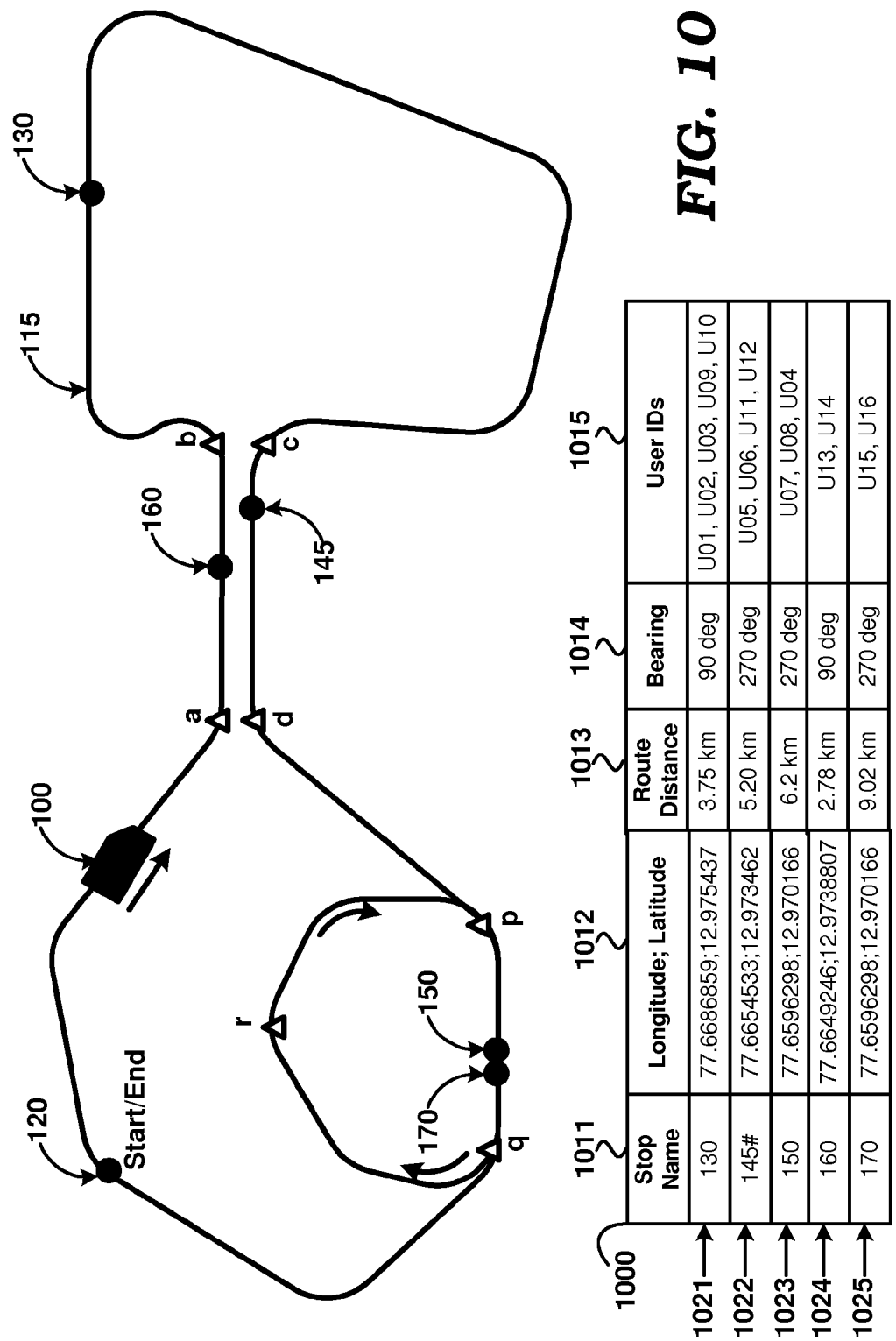

FIG. 10 illustrates the custom rendezvous points updated based on normal mode of operation of a vehicle plying on another custom route in one embodiment.

Figure 11:
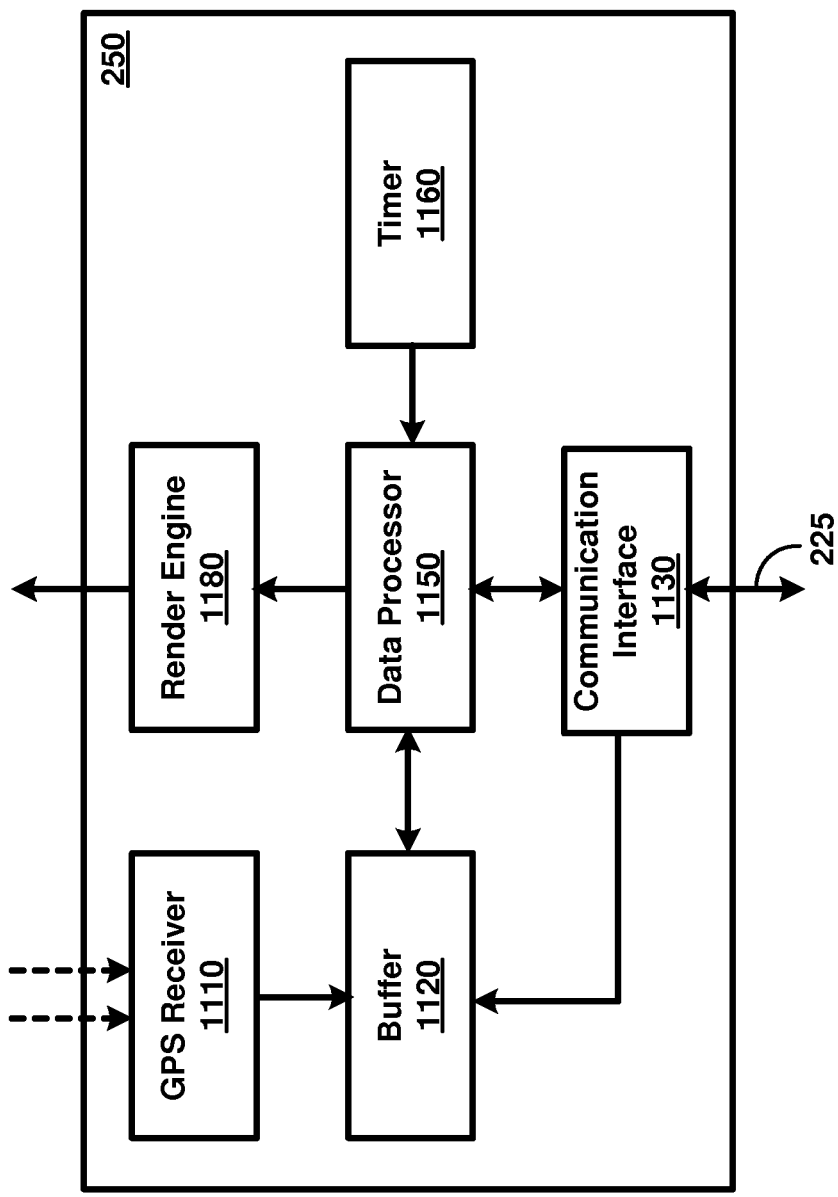

FIG. 11 is a block diagram illustrating the internal details of the stop identification (SI) tool in one embodiment.

Figure 12:
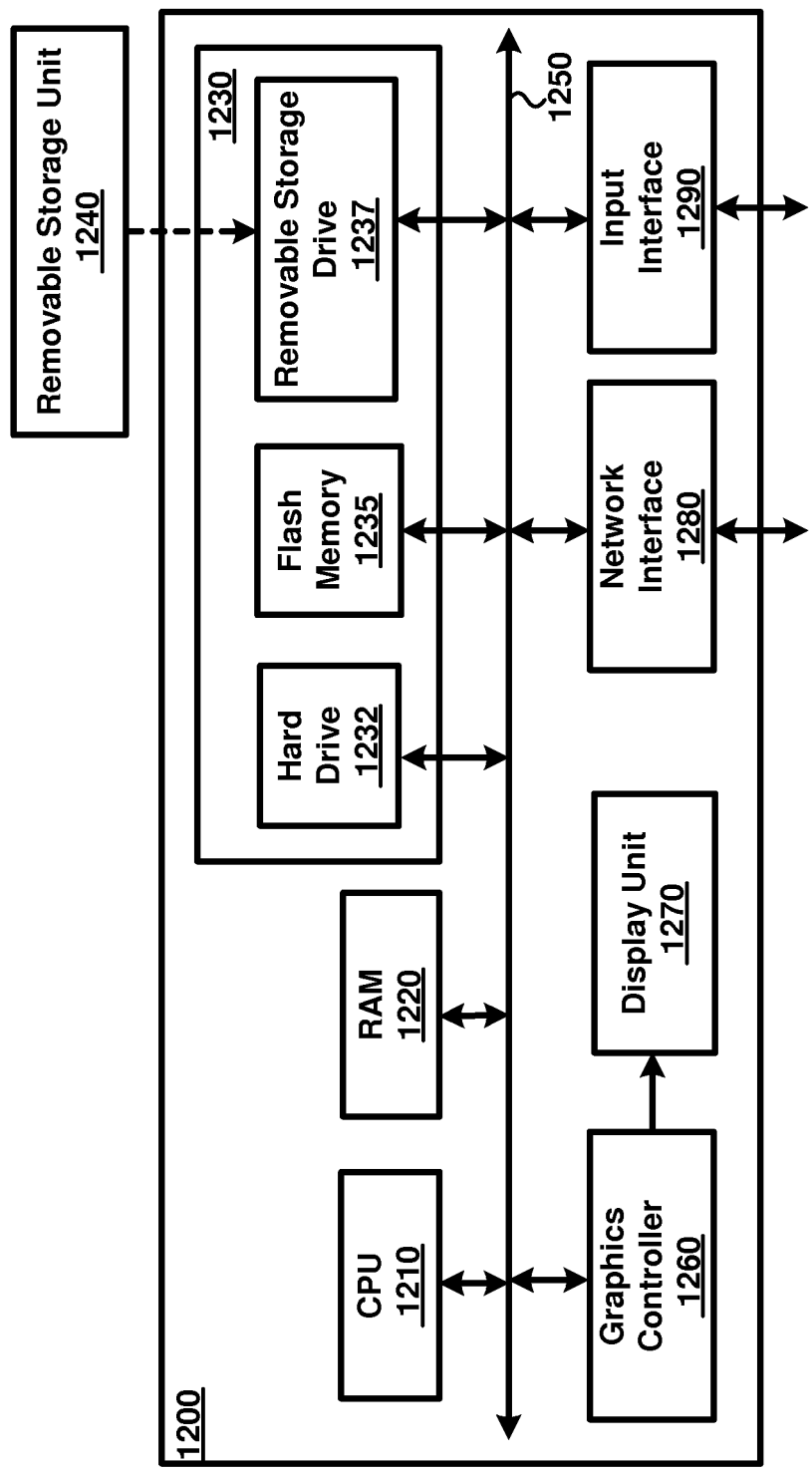

FIG. 12 is a block diagram illustrating the details of a digital processing system in which various aspects of the present invention are operative by execution of appropriate executable modules in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Example Environment

Figure 1:
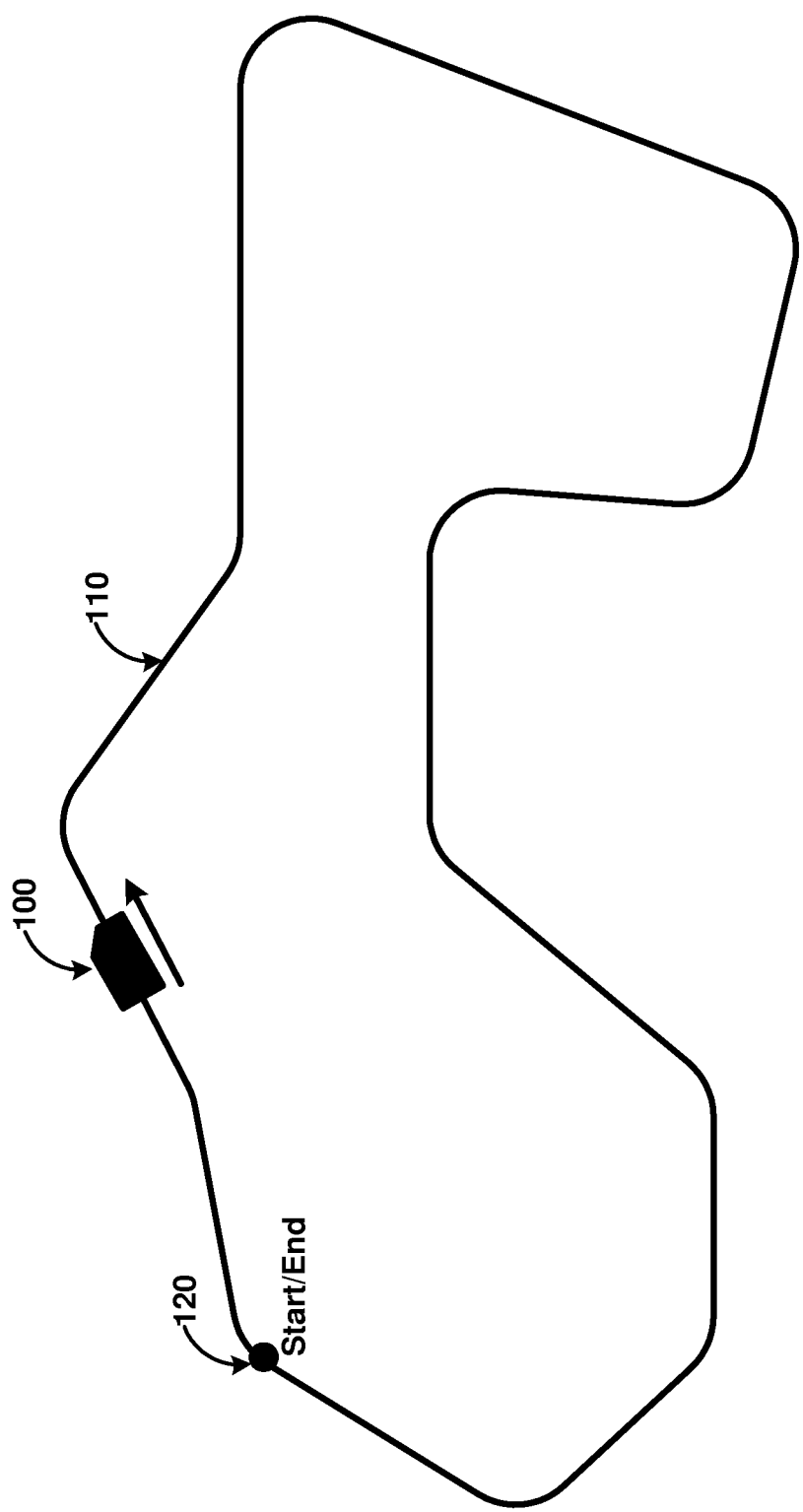
FIG. 1 is a block diagram illustrating an example environment (transport system) in which various aspects of the present invention can be implemented.

FIG. 1 is a block diagram illustrating an example environment (transport system) in which various aspects of the present invention can be implemented. The block diagram is shown containing vehicle 100, custom route 110 and start/end point 120.

Merely for illustration, only representative number of vehicles and routes are shown in the Figure. Many transport systems often contain many more vehicles/routes, both in number and complexity, depending on the purpose for which the transport system is designed. Each block of FIG. 1 is described below in further detail.

Vehicle 100 transports people and/or goods from one place to the other. A user/person who travels in the vehicle from one point to another is referred to as a passenger, while a user/person who accompanies/chaperons the passenger(s) and/or goods to the rendezvous point is referred to as an escort. The passengers board vehicle 100 at different points on the route and then disembark from vehicle 100 at other points on the route.

Custom route 110 represents a path that is traversed by vehicle 100 while transporting passengers from one point to another on the route. The arrow under vehicle 100 indicates the current direction of travel, that is, clockwise along custom route 110. As noted above, only a single route is shown here for convenience. However, in a real world transport system, there may be several custom routes with multiple vehicles plying on the different (or even the same) custom routes. An example of such a transport system is a fleet of school buses that plies on a set of custom routes for transporting students between their school and their respective homes.

Start/end point 120 represents both a source point from which the vehicle starts the traversal of custom route 110 and a destination point at which the vehicle ends the traversal of the route. The source and destination points are assumed to be the same start/end point 120 merely for convenience. However, in alternative embodiments, each of source and destination points may correspond to different points on the route or may be a physical location different from any of the points on the route.

Thus, vehicle 100 starts the traversal from start/end point 120 (in the clockwise direction), with various passengers boarding at different points on custom route 110 and returns back to start/end point 120, where the passengers disembark. An example vehicle is a school bus that starts from/near to a school premises (assumed to be near start/end point 120), picks up students along custom route 110 and then drops them in the premises of the school (at point 120).

It may be observed that there are no custom rendezvous points marked on custom route 110, and that vehicle 100 is plying the route based on prior experience (for example, knowing that users previously have boarded along this route), approximate requirements of the users (for example, the users specify an approximate geographical area such as street/pin code where they plan to board the vehicle), and/or being pre-defined by a manager/administrator of the vehicle (for example, a transport officer of the school).

Several aspects of the present invention facilitate identification of custom rendezvous points between users and vehicles plying on custom routes. The architecture of such a computing system in one embodiment is first described below with examples, followed by the manner in which the identification is performed.

2. Example Computing System

Figure 2:
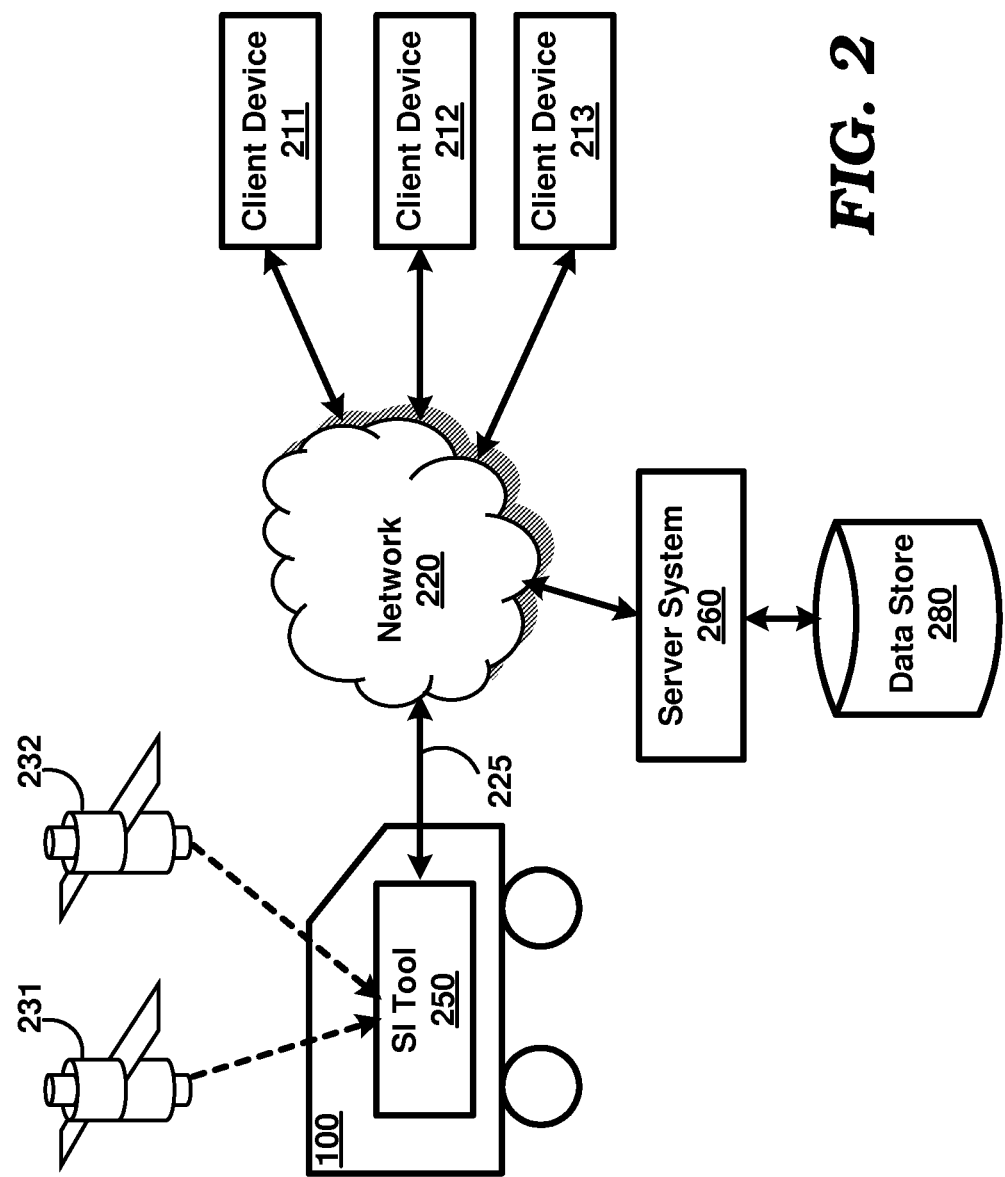
FIG. 2 is a block diagram illustrating the architecture of an example computing system identifying custom rendezvous points between users and vehicles plying on custom routes in one embodiment.

FIG. 2 is a block diagram illustrating the architecture of an example computing system identifying custom rendezvous points between users and vehicles plying on custom routes in one embodiment. The block diagram is shown containing client devices 211-213, network 220, global positioning system (GPS) satellites 231-232, stop identification (SI) tool 250 (shown located in/on-board vehicle 100), server system 260 and data store 280.

Merely for illustration, only representative number/type of systems is shown in the Figure. Many computing systems often contain many more systems, both in number and type, depending on the purpose for which the computing system is designed. Each system/device of FIG. 2 is described below in further detail.

Network 220 provides connectivity between client devices 211-213, SI tool 250 (located in vehicle 100), and server system 260. Network 220 may represent Wireless/LAN networks implemented using protocols such as Transport Control Protocol/Internet Protocol (TCP/IP), or circuit switched network implemented using protocols such as GSM, CDMA, etc. as is well known in the relevant arts.

In general, network 220 provides transport of packets, with each packet containing a source address (as assigned to the specific system from which the packet originates) and a destination address, equaling the specific address assigned to the specific system to which a packet is destined/targeted. The packets would generally contain the requests and responses between the connected devices, as described below.

Data store 280 represents a non-volatile storage, facilitating storage and retrieval of a collection of data by applications executing in server system 260. Data store 280 may maintain information such as user data received from client devices 211-213, modes of communication supported by each type of client device, information related to the custom routes, custom rendezvous points and/or vehicles, etc.

In one embodiment, data store 280 is implemented using relational database technologies and provides storage and retrieval of data using structured queries such as SQL (Structured Query Language), well known in the relevant arts. Alternatively, data store 280 may be implemented as a file server and store data in the form of one or more files organized in the form of a hierarchy of directories, as is well known in the relevant arts.

Each of client devices 211-213 represents a system such as a personal computer, workstation, mobile phone, fixed phone, WLL phone, IP-based phone, etc., used by users (such as passengers/escorts) to send data (in the form of requests) to SI tool 250 and/or applications executing in server system 260. The requests may be generated using appropriate user interfaces. In general, a client device enables a user to send requests for performing desired tasks to SI tool 250/server system 260 and to receive corresponding responses containing the results of performance of the requested tasks.

Server system 260 represents a server, such as a web and/or application server, executing various software applications designed to perform tasks (such as storing user specified data, etc.) requested by users using client devices 211-213. The applications may perform the tasks using data maintained internally in server system 260, on external data (e.g. maintained in data store 260) or data received with the request (for example, from the user). The results of performance of the tasks may then be sent as corresponding responses to the requesting client device.

GPS satellites 231-232 orbit around the earth enabling GPS-based devices (such as SI tool 250 on-board vehicle 100) to determine their current location at any point on the earth. Accordingly, GPS satellites 231-232 may provide information such as latitude, longitude, bearing/direction, altitude, time, speed, etc. to the GPS-based devices. The current location (of vehicle 100) can then be estimated by the GPS-based device (SI tool 250) to a desired accuracy as is well known in the arts.

SI tool 250 (located in vehicle 100), provided according to several aspects of the present invention, identifies custom rendezvous points between users and vehicles (such as vehicle 100) plying on custom routes (such as custom route 110) as described below with examples.

3. General Flow

Figures 3A, 4:
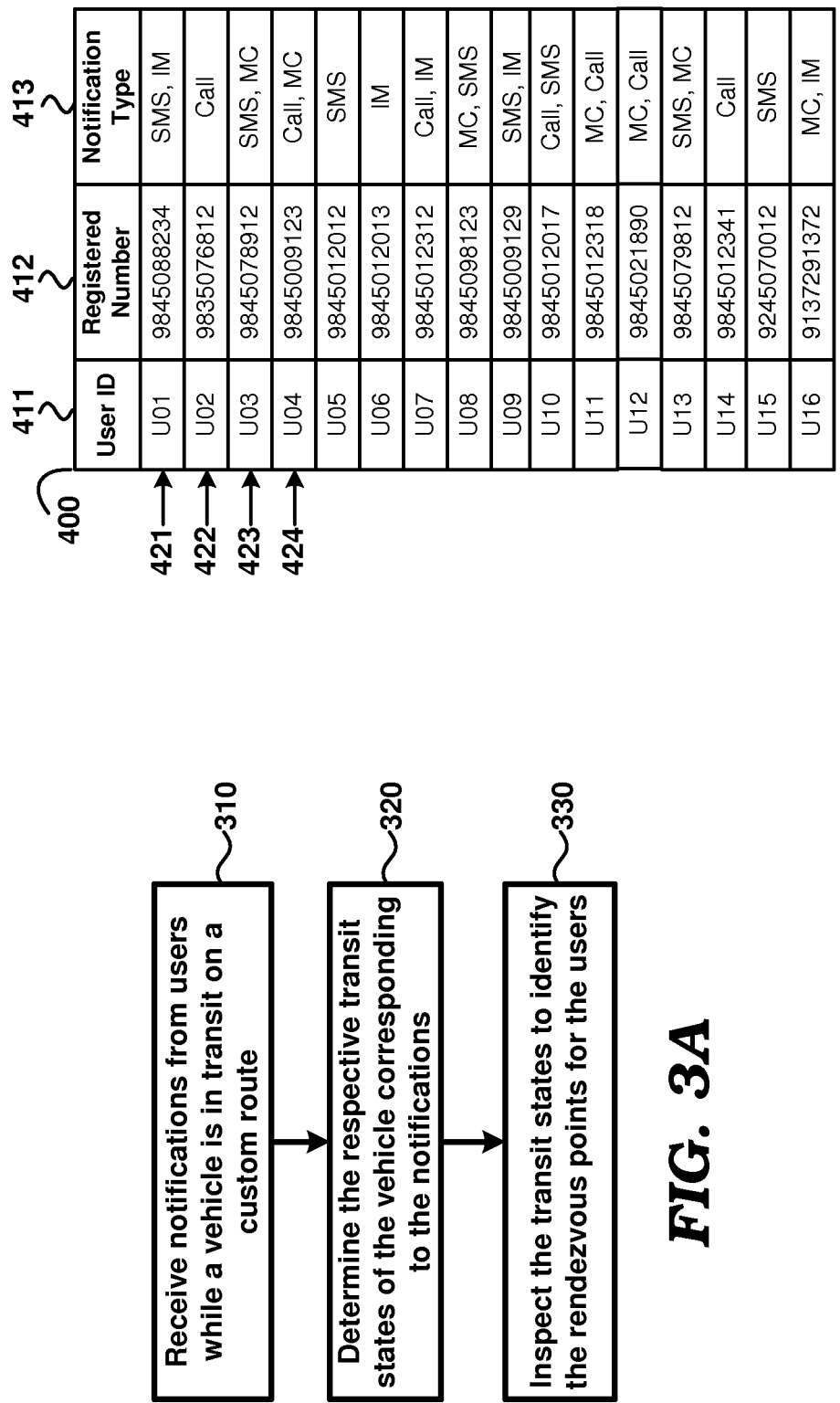
FIG. 3A is a flowchart illustrating the manner in which custom rendezvous points between users and vehicles plying on custom routes are identified according to an aspect of the present invention.
FIG. 4 depicts the manner in which information related to a set of registered users is maintained in one embodiment.

FIG. 3A is a flowchart illustrating the manner in which custom rendezvous points between users and vehicles plying on custom routes are identified according to an aspect of the present invention. The flowchart is described with respect to FIGS. 1 and 2 merely for illustration. However, various features can be implemented in other environments also without departing from the scope and spirit of various aspects of the present invention, as will be apparent to one skilled in the relevant arts by reading the disclosure provided herein.

In addition, some of the steps of FIG. 3A may be performed in a different sequence than that depicted below, as suited in the specific environment, as will be apparent to one skilled in the relevant arts. Many of such implementations are contemplated to be covered by several aspects of the present invention.

In step 310, SI tool 250 receives notifications from users while vehicle 100 is plying/in transit on custom route 110. The notifications may be received from the users using one of client devices 211-213, and may be in any convenient form such as a short message service (SMS) message, a multimedia message service (MMS) message, an instant messaging (IM) message, email, missed/connected call, etc. The notifications may be received from either the passengers on board the vehicle or from the escorts accompanying the passengers (and accordingly from outside the vehicle).

In one embodiment described below, users (either the passengers or the escorts) are required to register with server system 260 by providing their personal information (for example, a mobile number or email address). SI tool 250 thereafter is designed to accept and/or process only the notifications received from the registers users, in particular, from their registered mobile numbers/email addresses. Such registration facilitates pre-determination of the fixed group of users that may board the vehicles in the corresponding custom routes.

In step 320, SI tool 250 determines the respective transit states of vehicle 100 corresponding to the notifications. A transit state represents the state/values of various variables that capture the static and/or dynamic aspects of the vehicle in transit on the custom route, when a notification is received. Examples of such variables are the longitude and latitude (GPS location) of the vehicle at the time of receipt of the notification, the distance travelled by the vehicle from start/end point 120 (hereafter referred to as "route distance"), the bearing or direction of movement of the vehicle, the speed of the vehicle, and a dwell time indicating the duration for which the vehicle has been at that GPS location.

The determination of the specific values of the variables may be performed by SI tool 250 in a known way. For example, the GPS location may be determined based on the data received from one or more of GPS satellites such as 231-232. The speed of the vehicle may be determined based on sensors attached to the bus or based on tracking the previous few GPS locations of the vehicle. The values of the other variables and accordingly the transit state corresponding to each notification may be similarly determined.

In one embodiment, the determined transit states and the details of the corresponding notifications (such as the time of notification, the registered user who sent the notification) are stored in a non-volatile storage such a hard disk/flash memory internal to SI tool 250/vehicle 100 or external storage such as data store 280. The stored transit states may later be retrieved and processed for identification of the custom rendezvous points as described below.

In step 330, SI tool 250 inspects the (determined and stored) transit states to identify the custom rendezvous points for the users. The identification of the rendezvous points may be based on the various values of the variables captured in the transit state. In the disclosure herewith, the term "transit state" is conveniently used to indicate the information captured in the transit state, with the specific values referred to being clear from the context in which the term is used.

Figure 3C:
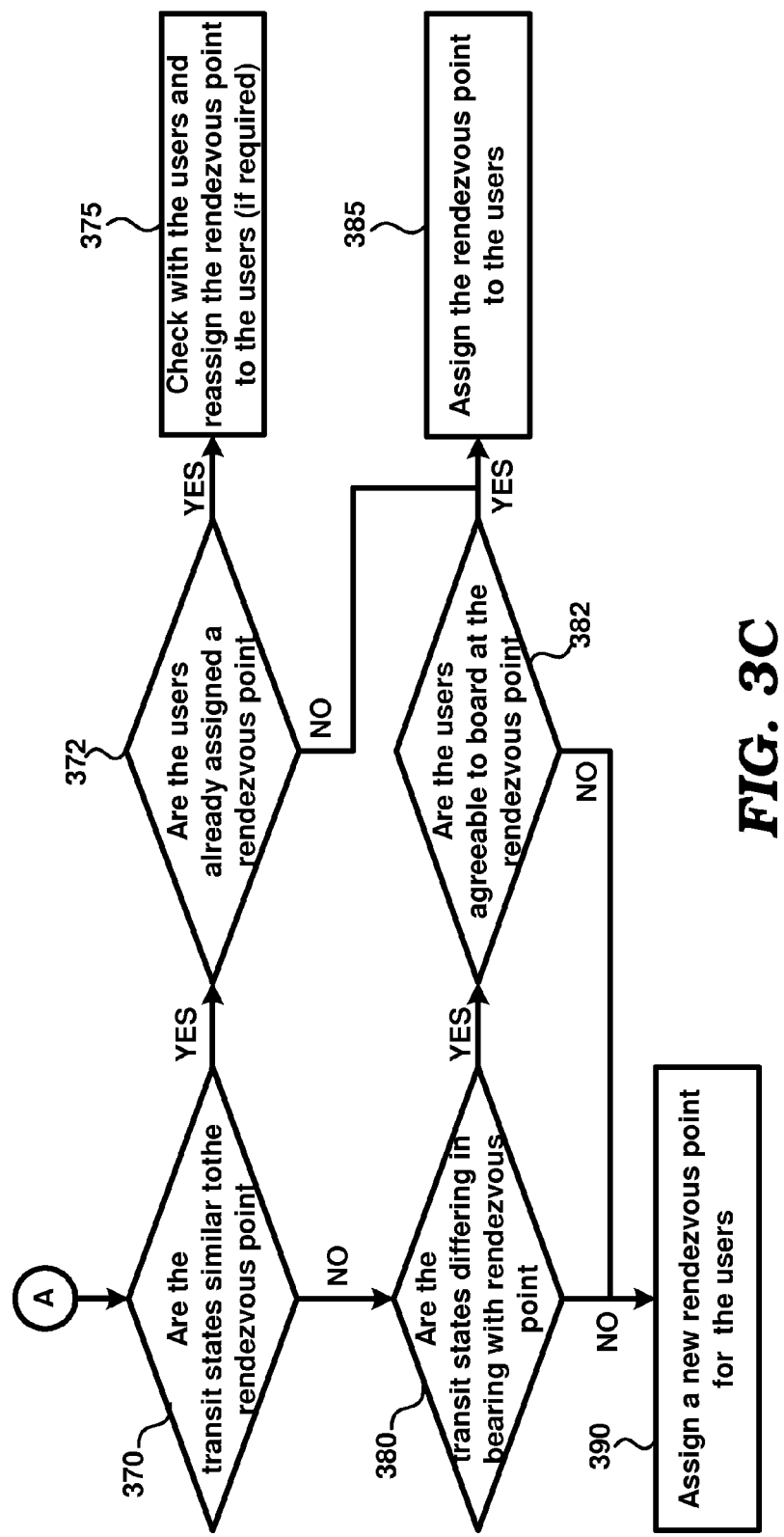
FIG. 3C is a flowchart illustrating the manner in which custom rendezvous points between users and vehicles plying on custom routes are identified during normal mode of operation according to an aspect of the present invention.

The manner in which the rendezvous points between the users and the vehicle are identified is described in more detail with respect to the flow charts of FIGS. 3B and 3C. Though the steps of FIGS. 3B and 3C are described as being performed SI tool 250, it may be appreciated that in alternative embodiments, the steps may be performed by server systems 260, or a combination thereof, with some of the steps being performed by SI tool 250 and the remaining steps being performed by server system 260.

Broadly, the identification of the custom rendezvous points may be performed in two different scenarios: (1) when there are no pre-existing custom rendezvous points either on the whole or substantial sections of the custom route (hereafter referred to as "Initialize" mode of operation); and (2) when there are already a good number of rendezvous points already identified along the custom route (hereafter referred to as "Normal" mode of operation).

It may be appreciated that the initialize mode of operation may correspond to the scenario when the vehicle has just begun to ply a new custom route and new custom rendezvous points are being added regularly based on the notifications received from the users. In contrast, the normal mode of operation corresponds to the scenario where the vehicle is operating regularly on the custom route after the custom rendezvous points of a majority of the users in the fixed set have been identified. The manner in which identification is performed during initialize mode of operation is first described below with examples, followed by the performance of the identification during the normal mode.

4. Identification of Custom Rendezvous Points During Initialize Mode

FIG. 3B is a flowchart illustrating the manner in which custom rendezvous points between users and vehicles plying on custom routes are identified during initialize mode of operation according to an aspect of the present invention. The flowchart is described with respect to FIGS. 1 and 2 merely for illustration. However, various features can be implemented in other environments also without departing from the scope and spirit of various aspects of the present invention, as will be apparent to one skilled in the relevant arts by reading the disclosure provided herein.

In addition, some of the steps of FIG. 3B may be performed in a different sequence than that depicted below, as suited in the specific environment, as will be apparent to one skilled in the relevant arts. Many of such implementations are contemplated to be covered by several aspects of the present invention.

In step 340, SI tool 250 collects the transit states corresponding to notifications received within a window. The window may be specified in terms of time (e.g. 2 minutes), distance (e.g. 2 kilometers) or a suitable combination of both. The size of the window may be conveniently chosen based on the custom route traversed by the vehicle. For example, if a custom route facilitates the vehicle to travel at an average speed of 60 km/hour, the size of the window may be chosen to be 2 minutes or 2 kilometers. Alternatively, if the custom route facilitates the vehicle to travel only at 30 km/hour, the size of the window can be made larger (e.g. 5 minutes), since the distance traversed by the vehicle within the window would be much less (in comparison to the previous scenario).

The size of the window (and the manner in which the window is specified) may also depend on other factors such as the maximum number of rendezvous points allowed on the custom routes, a minimum distance requirement between any two rendezvous points, the general geography/terrain of the custom route (for example, the size of the window may be made changed in the sections that are uphill), and the general distribution of the users along the custom route (for example, a densely populated residential area may require addition rendezvous points).

Thus, SI tool 250 collects the transit states for notifications within each window and then processes them together as described below with examples. It should be noted that the processing of multiple notifications together facilitates to some extent the identification of optimal rendezvous points for the users.

It may be appreciated that SI tool 250 may also dynamically change the size and/or the start point of the window. For example, when only a few (e.g., less than 2) notifications are received within a window, SI tool 250 may dynamically merge such a window with a next succeeding window to form a larger window. SI tool 250 may then wait to collect the transit states corresponding to notifications received within the larger window, before processing the transit states. Alternatively, SI tool 250 may dynamically change the start point of the window, for example, starting the window from a first notification received, thereby ensuring that the window includes a sufficient number of transit states (for processing).

In step 350, SI tool 250 checks whether there exists a rendezvous point within the window. The existence of a rendezvous point within the window indicates that the users may have boarded at or close to the rendezvous point and the absence of the rendezvous point may indicate that a new rendezvous point needs to be identified within the window.

The determination of the rendezvous point may be performed based on the transit states within the window and the state of the different rendezvous points. In one embodiment, SI tool 250 maintains the GPS location, bearing/direction and the route distance from start/end point 120 (collectively representing the "transit state") of each of the rendezvous points identified along custom route 110. The determination is then performed by first computing a distance between each of the transit states in the window and each of the existing rendezvous points, and then selecting a rendezvous point as being within the window if the rendezvous point is within a fixed distance from the transit states.

It may be appreciated that the probability of a rendezvous point existing within a window is high during the normal mode of operation, in comparison to during the initialize mode of operation. Accordingly, control passes to the flow chart of FIG. 3C as indicated by the continuation (A) when a rendezvous point exists in the window (during normal mode of operation), and to step 361 otherwise (during initialize mode of operation). Steps 361 to 366 illustrate the manner in which new rendezvous points are identified during initialize mode of operation.

In step 361, SI tool 250 determines whether there exists a transit state having zero speed and a long (pre-configured) dwell time. The existence of such a transit state indicates that the users boarded vehicle 100 at a common location, though the notifications were received at different locations on the custom route. Such a scenario may exist since the passengers/escorts can send the notifications before boarding (on visually sighting the vehicle), during boarding (an escort sends the notification while the passenger is boarding) or after boarding vehicle 100 (an escort send the notification after the passenger has boarded the vehicle).

Thus, if such a transit state can be determined, control passes to step 362, where SI tool 250 assigns the location corresponding to the transit state as the new rendezvous point for the users. In a scenario, multiple transit states have zero speed and a long dwell time, the transit state with the longest dwell time may be chosen as the matching transit state. Control passes to step 363 if such a transit state is absent/cannot be determined indicating that the users boarded vehicle 100 at different physical locations along custom route 110.

In step 363, SI tool 250 determines whether there is a point of interest (POI) within a specific (pre-configured) distance from the transit states. A point of interest represents a prominent location on custom route 110 that would be easily identifiable to a large number of users (including the users from whom the notification within the window has been received).

SI tool 250 may accordingly maintain a list of point of interests such as educational institutions, land marks, junctions, and places of worship present on custom route 110. SI tool 250 may then compute the distance between the transit states and the different POIs in the list to determine the POI within the pre-configured distance from the transit states.

Thus, if such a point of interest can be determined, control passes to step 364, where SI tool 250 assigns the determined POI as the new rendezvous point for the users. Control passes to step 365, if no POI can be determined to be within the pre-configured distance from the transit states.

In step 365, SI tool 250 determines a location having an average distance from each of the transit states. Such a determination may occur in the scenario that different users have boarded vehicle 100 at different GPS locations that are fairly apart (for example, 500 meters). In such a scenario, the above two noted checks of step 361 and 363 fails, and it may be desirable that a rendezvous point by "consensus" be arrived at for the users.

One manner in which such consensus is achieved is by determining a location that is an average distance from the transit states/notification points. Such determination of an average location ensures that the users are required to walk/commute only a short distance for rendezvousing with vehicle 100. Furthermore, if two sets of users board a short distance apart, the average computation ensures that the rendezvous point is closer to (and accordingly reduces the commute for) the set having the larger number of users.

In one embodiment, SI tool 250 also maintains a corresponding flag for each of the (newly) identified rendezvous points, the flag indicating whether the corresponding rendezvous point has been arrived by "consensus" or not. The flag may be later used for re-computing the location of the rendezvous point, when more notifications are received from users (during normal mode of operation), as described in below sections.

In step 366, SI tool 250 assigns the average location as a new rendezvous point for the users. The assignment of a rendezvous point to users may entail storing the state of the new rendezvous point and a corresponding association between the users and the new rendezvous point in a non-volatile storage (for example, data store 280), and then sending confirmation messages (in the form of SMS or email based on the preference indicated) to each of the users (who sent the notifications) indicating the new rendezvous point.

In one embodiment, a list of identified rendezvous points is provided to an administrator to facilitate the administrator to specify a corresponding (easily recognizable) name to each of the rendezvous points. In addition (or alternatively), the users (who sent the notifications) are requested to provide the names for the rendezvous points. The confirmation messages to the users are sent after the rendezvous points have been named by the administrator and/or users. It should be noted that the above noted actions of step 366 are also performed as part of steps 362 and 364, in response to the assignment of the corresponding new rendezvous point to the users.

Thus, SI tool 250 identifies custom rendezvous points between users and vehicle 100 plying on custom route 110 during initialize mode of operation. It may be appreciated that the steps of FIG. 3B (and also FIG. 3C described below) may be performed during each traversal of custom route 110 by vehicle 100. Such traversals are typically performed at regular intervals, for example, every day morning and/or evening.

SI tool 250 may accordingly identify a number of custom rendezvous points between the users and vehicle 100 plying on custom route 110. Once a sufficient number of custom rendezvous points have been identified, any further traversals of custom route 110 may be viewed as normal mode of operation for vehicle 100. The manner in which identification is performed during normal mode of operation is described below with examples.

4. Identification of Custom Rendezvous Points During Normal Mode

FIG. 3C is a flowchart illustrating the manner in which custom rendezvous points between users and vehicles plying on custom routes are identified during normal mode of operation according to an aspect of the present invention. The flowchart is described with respect to FIGS. 1 and 2 merely for illustration. However, various features can be implemented in other environments also without departing from the scope and spirit of various aspects of the present invention, as will be apparent to one skilled in the relevant arts by reading the disclosure provided herein.

In addition, some of the steps of FIG. 3C may be performed in a different sequence than that depicted below, as suited in the specific environment, as will be apparent to one skilled in the relevant arts. Many of such implementations are contemplated to be covered by several aspects of the present invention. As noted above, the following steps are performed by SI tool 250 when a custom rendezvous point exists in the window (during normal mode of operation) along with the transit states corresponding to the notifications received within the window. Each of the steps is described in detail below.

In step 370, SI tool 250 checks whether the transit states are similar to the (custom) rendezvous point existing within the window. In other words, SI tool 250 checks whether the users are boarding at the existing rendezvous point by determining whether the transit states of vehicle 100 corresponding to the notifications received from the users are similar to the state of the existing rendezvous point.

As noted above, SI tool 250 maintains the GPS location, bearing/direction and the route distance as part of the state of each of the rendezvous points identified along custom route 110. SI tool 250 may accordingly compare the GPS location, bearing/direction and the route distance of the existing rendezvous point with the values of similar variables captured in the transit states. Control passes to step 372 if the transit states are determined to be similar (within an acceptable range of the GPS location and route distance, and having the same bearing) to the existing rendezvous point, and to step 380 otherwise.

In step 372, SI tool 250 checks whether the users (who send the notifications) have been already assigned a rendezvous point. The determination may be performed by checking whether the users have an association with any existing rendezvous point (not necessarily the one identified within the window) in the rendezvous point information stored by SI tool 250, described above with respect to step 366.

Such a determination may be required to capture the movement of users from the already assigned rendezvous point to the rendezvous point existing within the window. Thus, control passes to step 375, if the users have an associated rendezvous point and to step 385 otherwise.

In step 375, SI tool 250 checks with the users and reassigns the rendezvous point to the users (if required). The check may be performed by calling each user and orally checking with the user whether boarding of vehicle 100 at the rendezvous point within the window was an one-time occurrence (for example, due to missing the vehicle at the already assigned rendezvous point), or whether the user wishes to permanently move to the rendezvous point within the window.

In one embodiment, such checking is performed by sending corresponding query messages (e.g. SMS or email) to the users, each query message indicating the already assigned rendezvous point of the user and the confirmation required (noted above). Each user is then required to send a response only in the scenario that the user wishes to permanently move to the rendezvous point within the window. If no response is received, SI tool 250 assumes that the boarding was a one-time occurrence, and stops processing of the notification sent by the user.

In a scenario that the users wish to permanently move to the rendezvous point within the window, SI tool 250 reassigns the rendezvous point to the users. Such reassignment entails updating the rendezvous point information by removing the association between the users and the already assigned rendezvous point and adding a new association between the users and the rendezvous point within the window.

It may be appreciated that in one scenario, the already assigned rendezvous point for a user can be the same as the rendezvous point within the window. Such a scenario may arise if the user did not receive a confirmation message indicating the rendezvous point when it was previously assigned. In such a scenario, a confirmation message re-confirming the assignment of the rendezvous point within the window to the user may be sent (instead of a query message).

In step 380, SI tool 250 checks whether the transit states are differing in bearing/direction with the (custom) rendezvous point determined within the window. The difference in bearing/direction may indicate that the users are boarding vehicle 100 on the side of the road/route opposite to the side where the rendezvous point is located. The difference may also be due to the terrain traversed, for example, when two sections of custom route 110 are geographically close to each other, and vehicle 100 traverses the two sections in different directions.

Control passes to step 382, if the transit states are determined to be differing in bearing/direction with the state of the rendezvous point determined within the window, and to step 390 otherwise (where a new rendezvous point is assigned, as described in detail below).

In step 382, SI tool 250 checks whether the users are agreeable to board at the (existing) rendezvous point within the window. Such a check may be performed orally by placing calls to the users or by sending query messages, similar to the checking of step 375. Control passes to step 385, if the users are agreeable to board at the existing rendezvous point, and to step 390 otherwise (where a new rendezvous point is assigned, as described in detail below).

It may be appreciated that the checking of step 382 may be skipped and control passed directly to step 390 in the scenario that SI tool 250 determines that the users will be unable to board the vehicle at the existing rendezvous point within the window. The inability of the users may be due various factors such as the presence of a physical obstruction (such as a road divider) on that section of the custom route, and the terrain making transit states and the rendezvous point to be far apart (though the GPS locations may indicate otherwise). SI tool 250 may accordingly maintain a repository of such factors (in data store 280), determine the inability of the users based on the repository and then pass control to step 390 directly (without performing the steps of 382 and 385).

In step 385, SI tool 250 assigns the (existing) rendezvous point to the users (when the users have not been already assigned a rendezvous point or when the users are agreeable to board at the existing rendezvous point). Such an assignment may be performed by associating the users with the existing rendezvous point in the rendezvous point information.

In a scenario that the flag associated with the (existing) rendezvous point indicates that the rendezvous point has been identified by "consensus" (that is, by taking the average location), SI tool 250 may then re-compute the location of the existing rendezvous point based on the locations of the current users already boarding at the rendezvous point and the new users sought to be assigned. The re-computed rendezvous point may then be assigned to all the current users and the new users, by updating the rendezvous point information, and re-sending confirmation messages, as described above with respect to step 366.

In step 390, SI tool 250 assigns a new rendezvous point for the users within the window. In other words, the already existing rendezvous point within the window is ignored and a new rendezvous point is identified in addition to the existing rendezvous point. Accordingly, the identification of the new rendezvous point may be performed similar to steps 361-366 (since it is assumed that there is no rendezvous point in the window), and the newly identified rendezvous point is then assigned to the users.

It may be appreciated that a new rendezvous point is identified in two different scenarios, based on the step from which control passes to step 390. In a first scenario when control passes from the YES branch of step 380 (either after performing or skipping step 382), the new rendezvous point is identified due to the inability or the dislike of the users to use the existing rendezvous point. The new rendezvous point may accordingly be a point opposite to (or close to) the existing rendezvous point on the custom route.

In the second scenario when control passes from the NO branch of step 380, the new rendezvous point is identified for transit state that are close to (based on GPS locations) and have the same bearing/direction as the existing rendezvous point, but differ in the route distance with the existing rendezvous point. Such a scenario may arise when vehicle 100 performs multiple traversals of the same section of custom route 110, with the existing rendezvous point being present during a first traversal, while the users (from whom the notifications were received during the window) boarding vehicle 100 during a second traversal, different from the first traversal. Thus, it may be necessary that a new rendezvous point be identified for the users during the second traversal of the same section of custom route 110.

Thus, SI tool 250 identifies custom rendezvous points between users and vehicle 100 plying on custom route 110 during normal mode of operation. It may be appreciated that the steps of 370, 380 and 390 (the second scenario noted above) are shown as being performed when all the transit states within a window satisfy a corresponding condition. However, in real world implementations, there may be any combination of transit states that are similar, transit states that differ in bearing, and transit states that differ in route distance within the same window.

SI tool 250 may accordingly perform multiple iterations of the steps of FIG. 3C, with each type of transit states being processed during a corresponding iteration. Alternatively, the flow chart of FIG. 3C may be suitably modified to cause all the types of transit states to be processed during single execution of the flow chart. For example, the checks of steps 370 and 380 may be modified to identify only the transit states of the corresponding type and to process them respectively in steps 372/375 and steps 382/385, and control may be passed from step 375 to step 380, and from step 385 to step 390 (after the respective processing) to enable the other types of transit states to be processed.

Thus, SI tool 250 identifies custom rendezvous points between users and vehicles plying on custom routes. The manner in which such identification may be performed is described below with examples.

5. Illustrative Example

FIGS. 4 through 10 together illustrates the manner in which rendezvous points between users and vehicles (such as 100) plying on custom routes (such as 110) is identified in one embodiment. Broadly, FIG. 4 illustrates the information related to registered users, FIGS. 5A-5E and 6 together illustrate the identification of custom rendezvous points during initialize mode and FIGS. 7A-7B, 8, 9A-9C and 10 together illustrate the identification of custom rendezvous points during normal mode. Each of the FIG.s is described in detail below.

FIG. 4 depicts the manner in which information related to a set of registered users is maintained in one embodiment. As noted above, the set of registered users may represent the fixed groups of users that board different vehicles plying on different custom routes. In the following description, it is assumed that the set of registered users corresponds to the fixed group of users boarding a single vehicle (such as vehicle 100) plying on a single custom route (such as 110).

Thus, table 400 depicts a portion of information maintained in data store 280, which relates to the group of users boarding vehicle 100 along custom route 110. Table 400 (and also tables 500, 550, 600, 700, 800, 900 and 1000, described in below sections) may be stored in a volatile memory (such as a Random Access Memory (RAM) on board vehicle 100) or a non-volatile storage (such as data store 280). Each of the tables may correspond to a table in a database in the scenario that data store 280 is implemented according to relational database technologies. Alternatively, the information shown in each of the tables may be stored in the form of one or more eXtensible Markup Language (XML) files, in the scenario that data store 280 is implemented as a file server. The information/tables stored in the non-volatile storage may be later retrieved by SI tool 250 by appropriate communication with server system 260.

The registration of the users may be performed in any convenient manner. For example, each user wishing to board vehicle 100 plying on custom route 110 may be required to send a registration request (for example, to server system 260 or SI tool 250) in the form of a SMS/MMS message from the phone number sought to be registered. Alternatively, the users may be required to visit a website or send an email to provide a phone number to server system 260. Server system 260 may then send a message/place a missed call to the provided phone number to verify the existence of the phone number. The user may be further required to provide a response to the message sent by server system 260 to confirm their phone number.

In one embodiment, when the vehicle is a school bus, the information related to the passengers/students and the phone numbers of escorts/parents may be received at the time of admission of the students to the school. The received information may later be manually entered (for example, by an administrator of the system or a staff member of the school) into table 400 using any database/XML tool or convenient user interfaces provided by server system 260.

Column 411 "User ID" indicates a unique user identifier associated with each registered user. The unique identifier may be generated and allocated to each registered user upon successful registration of the user (for example, upon validation of the provided phone number). Column 412 "Registered Number" indicates the (possibly unique) phone number registered by each user. The registered number is a successfully validated phone number, and may correspond to (and uniquely identify) one of client devices 211-213 used by the user. As noted above, the registered number represents the phone number using which the registered user sends notifications to SI tool 250.

Column 413 "Notification Type" indicates the type of notification such as SMS, Call, instance messaging (IM) and missed call (MC) that the registered user wishes to send and/or receive. It may be observed that the value in column 413 is in the form of a comma separated list of types (for example, "Call, IM"), indicating that the same registered user may wish to send and/or receive notifications of the specified types (either of type "Call" or "IM").

In one embodiment described below, SI tool 250 and server system 260 are designed to send notifications, such as query messages, to each user only according to the notification types indicated in column 413 for the user. SI tool 250 and server system 260 are designed to receive from the users, notifications according to any of the notification types noted in column 413. In other words, the users can use any convenient notification type when sending notifications (such as 511-518, 711-715, etc described below) to SI tool 250 and/or server system 260.

Each of rows such as 421-424 specifies the details of a corresponding registered user. In particular, row 424 indicates a registered user having the user ID "U04", registered (phone) number as "9845009123", who prefers to receive notifications of type "Call, MC". Other rows similarly indicate the details of corresponding registered users.

Thus, the group of registered users boarding one or more vehicles plying on the same/different custom routes is maintained by server system 260. The group of registered users boarding a specific vehicle plying on a specific custom route may then be provided by server system 260 to SI tool 250 (and may be stored in a non-volatile storage located in the vehicle). Thus, the data of table 400 may be provided by server system 260 to SI tool 250, before vehicle 100 starts plying custom route 110 (in other words, starts from start/end point 120).

The manner in which notifications received (and the corresponding transit states) from the group of registered users shown in table 400 are processed to identify custom rendezvous points for the registered users during initialize mode is described below with examples.

6. Example Illustrating Identification During Initialize Mode

FIGS. 5A-5E and 6 together illustrate the manner in which custom rendezvous points are identified during initialize mode (in particular, when there is no rendezvous point within the window) in one embodiment. Each of the FIG.s is described in detail below FIG. 5A illustrates the notifications received from registered users during initialize mode in one embodiment. In particular, notifications 511-518 represent notifications that are received during a (first) traversal of custom route 110 by vehicle 100, whereby there are no custom rendezvous points already identified on the route. In other words, the identification of the rendezvous points is being performed during the initialize mode of operation.

Broadly, SI tool 250 receives notifications (511-518) during the traversal of vehicle 100 along custom route 110 and then determines whether the notifications are received from registered users. For example, in response to a notification received from a user, SI tool 250 uses a Caller ID (also known as Caller Line Identification Presentation (CLIP), as is well known) service to determine the phone number of the user (from which the user has sent the notification), and then compares the determined phone number with the registered numbers shown in column 412 of FIG. 4.

In a scenario that there is registered number that matches the determined phone number, the user is identified as a registered user. Alternatively, the user may be requested to register or contact an administrator for availing the notification capability. As noted above, the notifications may be sent by the users in the form of any of the notification types noted in column 413. SI tool 250 then determines and maintains the transit states corresponding to the accepted notifications as described in detail below.

FIG. 5B illustrates the details of the transit states maintained corresponding to notifications received from registered users during initialize mode in one embodiment. In particular, table 500 depicts the transit states maintained corresponding to the notifications 511-518 shown in FIG. 5A. The transit states may be maintained in a volatile or non-volatile memory as described above with respect to table 400.

Column 521 "Time Of Notification" indicates the corresponding time at which each notification is received by SI tool 250 from a corresponding registered user. Column 522 "Longitude; Latitude" indicates the GPS location of vehicle 100 corresponding to each of the notifications. As noted above, the GPS location may be determined SI tool 250 based on communication with GPS satellites 231-232, as is well known in the arts. Column 523 "Route Distance" indicates the distance of (and travelled by) vehicle 100 from start/end point 120 corresponding to each of the notifications. The route distance, in terms of kilometers (shown as "km" in the FIG.), may be determined using a trip odometer or by computing the distance between the GPS location of start/end point 120 and the corresponding location shown in column 522.

It should be noted, that in alternative embodiments, a cumulative time indicating the total time of travel of vehicle 100 between start/end point 120 to the GPS location of the notification may be maintained instead of or in addition to the route distance. The computations based on route distance may be then appropriately modified to use the cumulative time, as will be apparent to one skilled in the relevant arts by reading the disclosure herein.

Column 524 "Bearing" indicates the direction of vehicle 100 corresponding to each of the notifications. In one embodiment, the direction is measured in degrees (shown as "deg" in the FIG.) with respect to the positive Y axis in a clockwise direction. Thus, 0, 90, 180 and 270 degrees respectively indicate North, East, South and West directions. Column 525 "Speed" indicates the speed of vehicle 100 corresponding to each of the notifications. The speed, in terms of kilometers per hour (shown a "kmph" in the FIG.), may be determined by SI tool 250 by interfacing with a speedometer on board vehicle 100. Alternatively SI tool 250 may keep track of the GPS locations of vehicle 100 at regular intervals, and then compute the speed based on the distance travelled during each interval.

Column 526 "Dwell time" indicates the duration for which vehicle 100 remained at same GPS location. In general, the dwell time of the vehicle will be a minimal duration (assumed to be 1 sec (second) in the FIG.) when the vehicle is moving (speed is not zero), and will be more than the minimal duration when the vehicle is stationary (speed is zero). Thus, the combination of speed and dwell time may indicate the location of the rendezvous point at which one or more users boarded vehicle 100. Column 527 "User ID" indicates the unique identifier (as shown in column 411 of FIG. 4) of the registered user from whom each of the notifications is received. The user ID may be determined SI tool 250 as a result of accepting the notification based on successful matching of the registered number.

Each of rows 531-538 specifies the details of a transit state corresponding to each of notifications 511-518 received from registered users. For example, row 531 indicates that notification 511 was received from user ID U01 (that is from the registered number "9845088234", in the form of a SMS/IM as indicated by columns 412 and 413) at the time instance "8:10:05 AM". Row 531 further indicates the GPS location as being "7.6685147; 12.975487", the route distance as being "3.730 km", the bearing as being "90 deg" the speed as being "4 kmph" and the dwell time being "1 sec" at the time of receipt of the notification by SI tool 250.

Similarly, the other rows specify the transit states corresponding to other notifications. For example, row 532 specifies the transit state corresponding to notification 512, and row 533 specifies the transit state corresponding to notification 513, etc. Thus, the transit states corresponding to the different notifications are maintained by SI tool 250. In the following description, reference numerals 511-518 (of FIG. 5A) and 531-538 (of FIG. 5B) are used interchangeably to refer to both of the notifications and the corresponding transit states.

It may be observed in FIG. 5A (and also according to the times of notification in FIG. 5B) that the notifications are received clustered together at specific points on custom route 110, as would be common in real world transport systems. For example, notifications 511-514 may be viewed as forming a first cluster, notifications 515-516 as a second cluster and 517-518 as a third cluster. Thus, it may be desirable that each cluster of notifications be processed together, instead of processing each notification separately. As noted above, in one embodiment, the notifications are collected during a window (of time/distance) and processed together. The manner in which windows may be selected is described below with examples.

7. Selecting and Processing Windows

Each of FIGS. 5C and 5D illustrates a corresponding manner in which windows for collecting notifications (for processing together) are selected in one embodiment. The windows are specified in terms of time and each window is assumed to be of the size of 2 minutes. Each of the FIG.s depicts a timeline with the corresponding windows marked on the timeline. For convenience, only the relevant portion of the timeline (from 8:10:00 AM to 8:18:05 AM) is shown in each FIG.

FIG. 5C depicts a timeline showing the windows as being successive, with each window of 2 minutes followed by another window of the same size. Thus, four different windows are shown from 8:10:00 AM to from 8:12:00 AM, from 8:12:00 AM to from 8:14:00 AM, from 8:14:00 AM to from 8:16:00 AM and from 8:16:00 AM to from 8:18:00 AM. The notifications 511-518 received from the registered users are shown distributed (approximately) on the time line based on the time of notification shown in column 521. It may be observed that the times are clustered together into three windows and that there are no notifications in the window from 8:14:00 AM to from 8:16:00 AM.

FIG. 5D depicts a time line showing the windows to be of the same size (2 minutes), but each window starting only at the time instance a new/unprocessed notification is received by SI tool 250. Thus, window W1 is shown starting from the time of notification (8:10:05 AM) of 511 and ending at 2 minutes after the time of notification (that is, at 8:12:05 AM). Similarly, windows W2 and W3 are respectively shown from 8:12:45 AM (time of notification of 515) to 8:14:45 AM and from 8:16:05 AM (time of notification of 517) to 8:18:05 AM.

It may be observed that the notifications are distributed differently over different windows based on the manner in which the windows are selected. As noted above, the size of each window and the manner in which the window is specified (for example, the start point) may be conveniently chosen based on the factors described above with respect to step 340. The description is continued assuming that the windows are chosen as shown in FIG. 5D, and accordingly the manner in which the notifications of windows W1, W2 and W3 are processed is described in detail below.

With respect to window W1, SI tool 250 transfers control from step 350 to step 361 as there is no rendezvous point already present within window W1. In step 361, SI tool 250 checks whether there exists a transit state (among 531-534 corresponding to notifications 511-514 in window W1) having zero speed and a long (pre-configured) dwell time. In one embodiment, any dwell time greater than the minimal duration of 1 second is taken to be long dwell time.

SI tool 250 may accordingly determine transit state 533 (corresponding to notification 513) having zero speed (as indicated in column 533) and dwell time of 20 seconds (which is greater than 1 second) as the transit state matching the condition. Control may accordingly pass to step 362 where SI tool 250 assigns the GPS location corresponding to transit state 533/notification 513 as the new rendezvous point (130) for the users who sent the notifications. Thus, the notifications of window W1 are processed to identify the new rendezvous point 130 for the users having user IDs U01-U04.

With respect to window W2, SI tool 250 transfers control from step 350 to step 361 (as there is no rendezvous point in the window) and then from step 361 to step 363 (as neither of the notifications 515 and 516 within window W2 have zero speed and long dwell time). In step 363, SI tool 250 determines whether there is a point of interest (POI) within a specific (pre-configured) distance from transit states 535 and 536. The manner in which details about POIs may be maintained is first described, followed by the processing of the notifications of window W2.

FIG. 5E illustrates the manner in which details of points of interest (POIs) are maintained in one embodiment. In particular, table 550 depicts the details of POIs along custom route 110. Only the details of a few POIs are shown in table 550 for conciseness, though in a real world transport system, there will be a large (typically, in the hundreds) number of POIs along each custom route. The details of POIs may be maintained in a volatile or non-volatile memory as described above with respect to table 400.

Column 561 "Name Of Point Of Interest" indicates the name associated with each of the points of interest, while column 562 "Longitude; Latitude" indicates the GPS location of each of the points of interest. Each of rows 571-572 specifies the details of a corresponding point of interest. For example, row 571 specifies a point of interest located at "77.6596298; 12.970166" and associated with the name "POI#1". The other rows similarly specify the details of other POIs maintained in table 550.

SI tool 250 accordingly maintains the details about the various POIs along custom route 110. SI tool 250 may then determine whether any POI is within a pre-configured distance from the transit states in a window. In the following description, the pre-configured distance is assumed to be 100 meters.

8. Computing Distances Using GPS Locations

The distance between any two GPS locations having corresponding longitudes "lon1" and "lon2" and corresponding latitudes "lat1" and "lat2" may be computed using the below formula (shown using pseudo-code like instructions):

```
double CONST_PiBy180 = 0.017453292519943 // Pi( )/180=
(3.14159265358979/180)
double deg2rad( double inDegrees ) {
    return ( inDegrees * CONST_PiBy180 )
}
double rad2deg( double inRadians ) {
    return ( inRadians / CONST_PiBy180 )
}
double calculate_distance_in_meters(lat1, lon1, lat2, lon2) {
double theta, dist
theta = lon1 − lon2
dist = sin(deg2rad(lat1)) * sin(deg2rad(lat2)) + cos(deg2rad(lat1))
        * cos(deg2rad(lat2)) * cos(deg2rad(theta))
dist = acos(dist)
dist = rad2deg(dist)
distance = dist * 60 * 1.1515
distance = distance * 1.609344 *1000
return distance
}
```

Where the functions "sin", "cos" and "acos" performs the mathematical operations of sine, cosine and arccosine. Thus, the "distance" between any two GPS locations (lat1; lon1) and (lat2; lon2) is computed by SI tool 250.

For window W2, SI tool 250 may accordingly compute the distance between the GPS locations of each of the POIs shown in table 550 and the GPS locations corresponding to the notifications 515 and 516. In the following description, the results of the computations are shown in a tabular form merely for convenience. In alternative embodiments, any convenient data structure (such as linked lists, arrays, trees, etc.) may be used for maintaining and comparing the computed values. The results of computation corresponding to the notifications in window W2 are shown below:

|  | Distance from POI#1 | Distance from POI#2 |
|---|---|---|
| Notification 515 | 740 m | 761 m |
| Notification 516 | 535 m | 526 m |
| Decision | Too Far Away | Too Far Away |

It may be observed that the POIs are not within the pre-configured distance of 100 meters from any of the notifications/transit states. SI tool 250 accordingly transfers control to step 365, wherein SI tool 250 determines a location having an average distance from each of transit states 535 and 536. SI tool 250 may accordingly determine a location having a route distance of 5.215 km (average distance of 0.125 km or 125 meters from either of transit states 535 and 536, having respective route distances of 5.09 km and 5.34 km).

As noted above, the average location computation ensures that the users are required to commute only a short distance (of 125 m) to rendezvous with vehicle 100. In step 366, SI tool 250 assigns the average location as a new rendezvous point (140) for the users who sent the notifications. Thus, the notifications of window W2 are processed to identify the new rendezvous point 130 for the users having user IDs U05 and U06.

With respect of window W3, SI tool 250 transfers control from step 350 to step 361 (as there is no rendezvous point in the window) and then from step 361 to step 363 (as neither of the notifications 517 and 518 within window W3 have zero speed and long dwell time). In step 363, SI tool 250 determines whether there is a point of interest (POI) within a specific (pre-configured) distance from transit states 537 and 538. The results of computation corresponding to the notifications in window W2 are shown below:

|  | Distance from POI#1 | Distance from POI#2 |
|---|---|---|
| Notification 517 | 23 m | 202 m |
| Notification 518 | 41 m | 211 m |
| Decision | Selected | Too Far Away |

It may be observed that POI#1 is within the pre-configured distance of 100 meters from both of the notifications/transit states 517 and 518 in window W3. SI tool 250 may accordingly transfer control to step 364, where SI tool 250 assigns the point of interest POI#1 as the new rendezvous point (150) for the users who sent the notifications. Thus, the notifications of window W3 are processed to identify the new rendezvous point 150 for the users having user IDs U07 and U08.

Thus, SI tool 250 processes the various notifications/transit states determined during a (first) traversal of vehicle 100 along custom route 110. SI tool 250 accordingly identifies the custom rendezvous points (130, 140 and 150) between the users (U01 to U08) and vehicle 100 during the initialize mode of operation. The manner in which the newly identified rendezvous points may be maintained by SI tool 250 is described below with examples.

9. Maintaining Identified Rendezvous Points

FIG. 6 illustrates custom rendezvous points identified during initialize mode (in particular, when there is no rendezvous point within the window) in one embodiment. In particular, custom rendezvous points 130, 140 and 150 (respectively identified based on notifications in windows W1, W2 and W3) are shown marked along custom route 110.

Table 600 specifies the state of each custom rendezvous point identified along the custom route. The state information may be later used for identification of rendezvous point within a window (during normal mode of operation). The rendezvous point states may be maintained in a volatile or non-volatile memory as described above with respect to table 400.

Column 611 "Stop Name" indicates the name associated with each of the rendezvous points. For simplicity, the Stop Name of each rendezvous point is indicated as a number. However, in real world transport systems, an administrator (or SI tool 250 based on a database) may provide a more user-readable stop name (such as the name of the POI, name of a street/area, name of a building, etc.) for each of the rendezvous points. Columns 612 "Longitude; Latitude", column 613 "Route Distance" and column 614 "Bearing" respectively specify the GPS location, the route distance and the bearing corresponding to each of the rendezvous points. Column 615 "User IDs" is a list of user identifiers identifying the users boarding vehicle 100 at each of the rendezvous points.

Each of rows 621-623 specifies the state of a corresponding custom rendezvous point identified by SI tool 250. For example, row 621 specifies that the rendezvous point associated with the stop name "130" has a GPS location of "77.6686859; 12.975437", a route distance of "3.75 km" and a bearing/direction of "90 deg". Row 621 also indicates that the users identified by the identifiers U01, U02, U03, U04 board vehicle 100 at the custom rendezvous point 130. The other rows similarly specify the state of other custom rendezvous points maintained in table 600.

It may be observed that the state of rendezvous point 130 is similar to the transit state 533 (corresponding to notification 513), since the rendezvous point 130 was assigned based on the transit state having zero speed and long dwell time among the transit states in window W1. The state of rendezvous point 140 is an average position (the route distance being 5.21 km, as computed above) from the transit states in window W2. Furthermore, the state of rendezvous point 150 is similar to the state of the point of interest POI#1, since the point of interest POI#1 was within the pre-configured distance of the transit states in window W3.

It may be further observed that rendezvous point 140 is stored along with a "#" (hash) symbol associated with the stop name (column 611 of row 622). The presence of the hash symbol indicates that the corresponding rendezvous point 140 has been identified by "consensus" (that is, by taking the average location). Thus, SI tool 250 may re-compute the location of rendezvous point 140, when new users are sought to be assigned to the same rendezvous point.

Thus, SI tool 250 maintains the state of the custom rendezvous points identified based on the notifications received from the users during initialize mode of operation. During further traversals by vehicle 100 along custom route 110, more notifications may be received. It may be appreciated that is a high probability that such notifications are received within a window that includes a rendezvous point (in other words, the normal mode of operation).

The manner in which notifications received (and the corresponding transit states) from the group of registered users shown in table 400 are processed to identify custom rendezvous points for the registered users during normal mode is described below with examples.

10. Example Illustrating Identification During Normal Mode

FIGS. 7A-7B, 8, 9A-9C and 10 together illustrate the manner in which custom rendezvous points are identified during normal mode (in particular, when there is a rendezvous point within the window) in one embodiment. Broadly, FIGS. 7A-7B and 8 together illustrate the identification of custom rendezvous points during normal mode when the transit states are similar to the state of the rendezvous point within the window and FIGS. 9A-9C and 10 together illustrate the identification of custom rendezvous points during normal mode when the transit states are different from the state of the custom rendezvous point within the window. Each of the FIG.s is described in detail below Referring again to FIG. 6, notifications 711-715 represent notifications that are received during a (second or further) traversal of custom route 110 by vehicle 100, whereby there are custom rendezvous points already identified on the route. In other words, the identification of the rendezvous points is being performed during the normal mode of operation. As noted above, SI tool 250 receives notifications (711-715) during the traversal of vehicle 100 along custom route 110 and then determines the transit states corresponding to only those notifications that are acceptable (coming from a registered number).

FIG. 7A illustrates the details of the transit states maintained corresponding to notifications received from registered users during normal mode in one embodiment. In particular, table 700 depicts the transit states maintained corresponding to the notifications 711-715 shown in FIG. 6. The transit states may be maintained in a volatile or non-volatile memory as described above with respect to table 400.

Each of columns 721-727 is similar to columns 521-527 of FIG. 5B and accordingly their description is not repeated here for conciseness. Each of rows 731-735 specifies the details of a transit state corresponding to each of notifications 711-715 received from registered users, similar to rows 531-538 of FIG. 5B. Thus, the transit states corresponding to the different notifications are maintained by SI tool 250. In the following description, reference numerals 711-715 and 731-735 are used interchangeably to refer to both of the notifications and the corresponding transit states.

FIG. 7B illustrates the windows used to process the notifications (711-715) received during normal mode in one embodiment. The windows are shown selected according to the manner described with respect to FIG. 5D, that is, each window starting from a new/unprocessed notification and being of size 2 minutes. Thus, window W4 (from 8:10:04 AM to 8:12:04 AM) is shown including notifications 711-712, window W5 (from 8:12:09 AM to 8:14:09 AM) is shown including notifications 713-714 and window W6 (from 8:16:10 AM to 8:18:10 AM) is shown including notification 715. The manner in which the notifications of windows W4, W5 and W6 are processed is described in detail below.

With respect to window W4, SI tool 250 first determines whether there is any rendezvous point within the window in step 350. In one embodiment, the determination is performed by first computing a distance between each of the transit states in the window (731-732) and each of the existing rendezvous points (130, 140 and 150), and then selecting a rendezvous point as being within the window if the rendezvous point is within a fixed distance (assumed to be 100 meters, in the below examples) from the transition states. Thus, SI tool 250 may perform the computations shown below for the transit states in window W4:

|   | Distance from Stop Name 130 | Distance from Stop Name 140 | Distance from Stop Name 150 |
| --- | --- | --- | --- |
| Notification 711 | 78 m | 457 m | 1097 m |
| Notification 712 | 62 m | 483 m | 1121 m |
| Decision | Selected | Too Far Away | Too Far Away |

SI tool 250 may accordingly determine in step 350 that rendezvous point 130 is within window W4, and then transfer control to step 370, where the transit states are checked for similarity with the state of rendezvous point 130. Thus, in step 370, SI tool 250 may compare the GPS location, route distance and bearing of rendezvous point 130 shown in row 621 with transit states 731-732 in window W4, as shown below:

|   | Longitude; Latitude | Route Distance | Bearing |
| --- | --- | --- | --- |
| Stop name 130 | 77.6686859; 12.975437 | 3.75 km | 90 deg |
| Transit state 731 | 77.6680298; 12.97565 | 3.68 km | 90 deg |
| Transit state 732 | 77.6681747; 12.9756765 | 3.68 km | 90 deg |
| Decision |  | Similar | Similar | Similar |

Since the transit states 731 and 732 in window W4 are similar to the state of rendezvous point 130, SI tool 250 passes control to step 372, where SI tool 250 checks whether the users have been already assigned a rendezvous point. SI tool 250 may accordingly check whether the corresponding user ID of each user (shown in column 727) is present in the list of user IDs specified in column 615 of table 600. As the respective user IDs U10 and U11 of the transit states 731 and 732 are not present in column 615, control passed to step 385, where SI tool 250 assigns the rendezvous point 130 to the users who sent the notifications. Thus, the notifications of window W4 are processed to assign the existing rendezvous point 130 for the users having user IDs U10 and U11.

With respect to window W5, SI tool 250 first determines in step 350, that rendezvous point 140 is within window W5 based on the computations shown below, then passes control to step 370:

|   | Distance from Stop Name 130 | Distance from Stop Name 140 | Distance from Stop Name 150 |
| --- | --- | --- | --- |
| Notification 713 | 420 m | 98 m | 724 m |
| Notification 714 | 409 m | 99 m | 733 m |
| Decision | Too Far Away | Selected | Too Far Away |

SI tool 250 then checks whether the transit states 733 and 734 are similar to the state of rendezvous point 140 as shown below, and passes control to step 372 and then to step 385 (since the user IDs U12 and U13 are not present in column 615 of table 600):

|   | Longitude; Latitude | Route Distance | Bearing |
| --- | --- | --- | --- |
| Stop name 140 | 77.6645432; 12.973253 | 5.21 km | 270 deg |
| Transit state 733 | 77.6654603; 12.973378 | 5.17 km | 270 deg |
| Transit state 734 | 77.6654533; 12.973462 | 5.19 km | 270 deg |
| Decision |  | Similar | Similar | Similar |

In step 385, SI tool 250 identifies that rendezvous point 140 has been identified by "consensus" (as indicated by the "#" symbol associated with the stop name), and accordingly re-computes the location of the rendezvous point 140. As noted above, the average location may be computed based on the route distance. Thus, SI tool 250 re-computes the average location based on the notification route distance of the current users (U05 and U06) and the notification route distance of the new users (U12 and U13), as shown below:

|  | Route Distance |
|---|---|
| Notification 515 | 5.09 km |
| Notification 516 | 5.34 km |
| Notification 713 | 5.17 km |
| Notification 714 | 5.19 km |
| Average location distance | 5.1975 km |

It may be observed that the newly computed route distance of approximately "5.20 km" is less than the current route distance "5.21 km" of rendezvous point 140, indicating that the rendezvous point has been moved towards the larger group of users (U05, U12 and U13 sending notifications 515, 713 and 714). SI tool 250 then identifies a new rendezvous point 145 corresponding to the re-computed average location, and stores the information about the new rendezvous point in table 600, while also removing the older rendezvous point 140 from the same table.

With respect to window W6, SI tool 250 first determines in step 350, that rendezvous point 150 is within window W5 based on the computations shown below, and then passes control to step 370:

|  | Distance from Stop Name 130 | Distance from Stop Name 140 | Distance from Stop Name 150 |
|---|---|---|---|
| Notification 715 | 1131 m | 626 m | 21 m |
| Decision | Too Far Away | Too Far Away | Selected |

SI tool 250 then determines that the transit state 735 is similar to the state of rendezvous point 150 as shown below, and passes control to step 372 and then to step 375, as the user ID U04 has already been assigned rendezvous point 130 (as indicated by column 615 of table 600):

|  | Longitude; Latitude | Route Distance | Bearing |
|---|---|---|---|
| Stop name 150 | 77.6596298; 12.970166 | 6.2 km | 270 deg |
| Transit state 735 | 77.659788; 12.970121 | 6.3 km | 270 deg |
| Decision | Similar | Similar | Similar |

In step 375, SI tool 250 send a query message to user (ID U04) indicating that the user has boarded vehicle 100 at rendezvous point 150 though the user is already assigned the rendezvous point 130, and accordingly whether the boarding at rendezvous point 150 was an one-time occurrence or whether the user wishes to permanently move to rendezvous point 150. The query message further indicates that the user is required to send a response to the query message only if the user wishes to permanently move to rendezvous point 150. Assuming that a response was received from the user (ID U04), SI tool 250 reassigns the rendezvous point 150 to user ID U04.

Thus, SI tool 250 processes the various notifications/transit states determined during a normal mode of operation (that is, during a later traversal) of vehicle 100 along custom route 110. SI tool 250 accordingly updates the rendezvous point information maintained in table 600, as described in detail below.

FIG. 8 illustrates the custom rendezvous points updated based on normal mode of operation in one embodiment. In particular, custom rendezvous points 140 is shown crossed out (X), and new rendezvous point 145 is shown marked along custom route 110. Table 800 depicts the rendezvous point information of table 600 updated based on the normal mode of operation, in particular, after the processing of notifications 711-715 as described above. Each of columns 811-815 is similar to columns 611-615 of FIG. 6 and accordingly their description is not repeated here for conciseness.

Each of rows 821-823 specifies the state of a corresponding custom rendezvous point identified by SI tool 250. It may be observed that the information in row 622 corresponding to stop name 140 is not present in table 800, instead row 822 specifies the state of the stop name 145 (newly identified based on average location). Stop name 145 is shown stored along with the hash symbol (#) to indicate that stop name 145 is also identified by "consensus". The users having IDs U05, U06, U11, U12 are indicated as boarding vehicle 100 at stop name 145.

It may be further observed that columns 811 and 813 are similar to columns 611 and 613, but with the value of User IDs column 815 updated to reflect the processing of notifications 711-715. In particular, row 811 indicates that new users having IDs U09 and U10 are also boarding at rendezvous point 130, and row 813 indicates that the user U04 (who was previously boarding at 130) is now boarding at rendezvous point 150 (along with the previous users U07 and U08).

Thus, SI tool 250 maintains the state of the custom rendezvous points identified based on the notifications received from the users during normal mode of operation. Several features of the present invention are now presented with respect to another custom route, described below with examples.

11. Another Custom Route

FIG. 9A is a block diagram depicting a vehicle plying another custom route in one embodiment. In particular, custom route 115 is a result of modifying custom 110 shown in FIG. 1, though a major portion of custom route 115 is still similar to custom route 110 and accordingly (custom route 115) has the rendezvous points identified for custom route 110 (as shown in table 800). The modifications may be due to new users requesting vehicle 100 to ply through their respective areas to enable the users to board the vehicle. The detour may also be due to other reasons such as road blocks, change of roads to one-ways, shorter optimal path identified, etc.

In one scenario, users may request vehicle 100 to ply section a-b (shown between triangular markers "a" and "b") opposite to section c-d of the earlier route (110). In other words, sections a-b and c-d represents the opposite sides of the same road that the vehicle traverses during different time instances while plying on custom route 115. As such, vehicle 100 may first traverse section a-b along one side of a road, then section b-c after stopping at rendezvous point 130 and then section c-d along the opposite side of the same road, while stopping at rendezvous point 145.

In another scenario, vehicle 100 may be required (based on the user requests) to traverse the same road, multiple times at different time instances. For example, vehicle 100 may first traverse section p-q after stopping at rendezvous point 150, then sections q-r and r-p (in the direction indicated by the arrows) to facilitate other (requesting) users to board the vehicle, and then section p-q again to enable the vehicle to proceed to start/end point 120 (from marker q). Thus, vehicle 100 performs two traversals of section p-q, when plying on custom route 115.

Several aspects of the present invention facilitate identification of custom rendezvous points between users and vehicle 100 plying on custom route 115 in the context of the two "special" scenarios noted above.

Referring again to FIG. 9A, notifications 911-914 represent notifications that are received during the normal mode of operation of vehicle 100 along custom route 115, whereby there are custom rendezvous points already identified on the route. As noted above, SI tool 250 receives notifications (911-914) during the traversal of vehicle 100 along custom route 115 and then determines the transit states corresponding to only those notifications that are acceptable (coming from a registered number).

FIG. 9B illustrates the details of the transit states maintained corresponding to notifications received from registered users during normal mode of operation of a vehicle (100) on another custom route (115) in one embodiment. In particular, table 900 depicts the transit states maintained corresponding to the notifications 911-914 shown in FIG. 9A. The transit states may be maintained in a volatile or non-volatile memory as described above with respect to table 400.

Each of columns 921-927 is similar to columns 521-527 of FIG. 5B and accordingly their description is not repeated here for conciseness. Each of rows 931-934 specifies the details of a transit state corresponding to each of notifications 911-914 received from registered users, similar to rows 531-538 of FIG. 5B. Thus, the transit states, corresponding to the different notifications, are maintained by SI tool 250. In the following description, reference numerals 911-914 and 931-934 are used interchangeably to refer to both of the notifications and the corresponding transit states.

FIG. 9C illustrates the windows used to process the notifications (911-914) received during normal mode of operation of a vehicle (100) on another custom route (115) in one embodiment. The windows are shown selected according to the manner described with respect to FIG. 5D, that is, each window starting from a new/unprocessed notification and being of size 2 minutes. Thus, window W7 (from 8:09:36 AM to 8:11:36 AM) is shown including notifications 911-912, and window W8 (from 8:22:23 AM to 8:24:23 AM) is shown including notifications 913-914. The manner in which the notifications of windows W7 and W8 are processed is described in detail below.

12. Processing Transit States Differing in Bearing/Route Distance

With respect to window W7, SI tool 250 first determines whether there is any rendezvous point within the window in step 350. As the rendezvous point is determined based only on the distance between the transit states in the window (911-912) and the existing rendezvous points (130, 145 and 150), SI tool 250 determines that rendezvous point 145 is within window W7, based on the computations shown below:

|  | Distance from Stop Name 130 | Distance from Stop Name 145 | Distance from Stop Name 150 |
| --- | --- | --- | --- |
| Notification 911 | 439 m | 80 m | 710 m |
| Notification 912 | 407 m | 42 m | 742 m |
| Decision | Too Far Away | Selected | Too Far Away |

SI tool 250, according passes control to step 370, where SI tool 250 checks whether the transit states 931 and 932 are similar to the state of rendezvous point 145 as shown below:

|  | Longitude; Latitude | Route Distance | Bearing |
| --- | --- | --- | --- |
| Stop name 145 | 77.6654533; 12.973462 | 5.20 km | 90 deg |
| Transit state 931 | 77.6649246; 12.973881 | 2.780 km | 270 deg |
| Transit state 932 | 77.6653519; 12.973845 | 2.784 km | 270 deg |
| Decision |  | Similar | Not Similar | Not Similar |

SI tool 250 then passes control to step 380 since the transit states are not similar to stop name 145, and then to step 382 since the transit states differ in the bearing with stop name 145. In step 382, SI tool 250 sends query messages to the users (having IDs U13 and U14) to check whether the users are agreeable to board at rendezvous point 145. The query messages/calls may be performed as per the notification types specified by the users (shown in column 413).

In the scenario, that all the users are agreeable to board vehicle 100 at rendezvous point 145, the existing rendezvous point 145 is assigned to the new users U13 and U14 along with the existing users U05, U06, U11, and U12. SI tool 250 may send confirmation messages to both the new and existing users indicating the new rendezvous point.

The description is continued assuming that either the new users U13 and U14 are not agreeable to board vehicle 100 at rendezvous point 145 or that SI tool 250 determines that the users U13 and U14 will be unable to (based on the repository of factors, noted above) board vehicle at rendezvous point 145. Control is accordingly transferred to step 390, where SI tool 250 assigns a new rendezvous point for the users within window W7. SI tool 250 may then perform the logic of steps 361-366 to identify the new rendezvous point. It may be appreciated that control passes to step 361 and then to step 362, since there exists a transit state 931 having zero speed and a long (greater than 1) dwell time. SI tool 250 then assigns the GPS location corresponding to transit state 931 as new rendezvous point 160 for the users U13 and U14.

With respect to window W8, SI tool 250 first determines in step 350, that rendezvous point 150 is within window W8 based on the computations shown below and then passes control to step 370:

|  | Distance from Stop Name 130 | Distance from Stop Name 145 | Distance from Stop Name 150 |
| --- | --- | --- | --- |
| Notification 913 | 1087 m | 674 m | 58 m |
| Notification 914 | 1119 m | 706 m | 28 m |
| Decision | Too Far Away | Too Far Away | Selected |

In step 370, SI tool 250 determines that the transit state 933 and 934 (corresponding to notifications 913 and 914) are not similar in route distance to the state of rendezvous point 150 as shown below, and passes control to step 380 and then to step 390 (as the states do not differ in their bearing):

|  | Longitude; Latitude | Route Distance | Bearing |
| --- | --- | --- | --- |
| Stop name 150 | 77.6596298; 12.970166 | 6.2 km | 270 deg |
| Transit state 933 | 77.6600875; 12.970355 | 9.023 km | 270 deg |
| Transit state 934 | 77.6597519; 12.970310 | 9.027 km | 270 deg |
| Decision |  | Similar | Not Similar | Similar |

In step 390, SI tool 250 identifies a new rendezvous point for the users (of IDs U15 and U16) by performing the logic of steps 361-366 based on transit states 933 and 934 corresponding to the notifications 913 and 914 received during window W8. For the transit states 933 and 934, control passes to step 363 (since there is not transit state with a zero speed), where the following computation may be performed:

|  | Distance from POI#1 | Distance from POI#2 |
|---|---|---|
| Notification 913 | 57 m | 201 m |
| Notification 914 | 26 m | 184 m |
| Decision | Selected | Too Far Away |

As there exists a point of interest (POI#1) within the pre-specified distance of 100 meters, SI tool 250 transfers control to step 364, where the POI (that is, its corresponding GPS location) is assigned as a new rendezvous point 170 for the users U15 and U16. It should be appreciated that thought the GPS location of both rendezvous points 150 and 170 are the same (POI#1), the rendezvous points are marked as different since the existing users U07, U08, U04 board during the first traversal of section p-q by vehicle 100 (after arriving at marker p from marker d), while the new users U15 and U16 board during the second traversal of section p-q by vehicle 100 (after arriving at marker p from marker r).

Thus, SI tool 250 processes the various notifications/transit states (differing in bearing or route distance) determined during a normal mode of operation (that is, during a later traversal) of vehicle 100 on custom route 115. SI tool 250 accordingly updates the rendezvous point information maintained in table 800, as described in detail below.

FIG. 10 illustrates the custom rendezvous points updated based on normal mode of operation of a vehicle (100) plying on another custom route (115) in one embodiment. In particular, new rendezvous point 160 is shown in section a-b, opposite to rendezvous point 145 shown in section c-d. Also, new rendezvous point 170 is shown adjacent to rendezvous point 150 for clarity, though both rendezvous points 150 and 170 represent the same physical location.

Table 1000 depicts the rendezvous point information of table 800 updated based on the normal mode of operation of vehicle 100 on custom route 115, in particular, after the processing of notifications 911-914 as described above. Each of columns 1011-1015 is similar to columns 611-615 of FIG. 6 and accordingly their description is not repeated here for conciseness.

Each of rows 1021-1025 specifies the state of a corresponding custom rendezvous point identified by SI tool 250. It may be observed that rows 1021-1023 are similar to rows 821-823 in table 800. Row 1024 specifies the details of the new rendezvous point 160 similar to transit state 931 (identified based on zero speed and long dwell time). Row 1025 specifies the details of the new rendezvous point 170, and has a location similar to POI#1 (shown in row 571 of FIG. 5E). Row 1024 also indicates that new users having IDs U13 and U14 are boarding at rendezvous point 160, and row 1025 also indicates that the users U15 and U16 are boarding at rendezvous point 170.

Thus, SI tool 250 processes the various notifications/transit states determined during later traversals (normal mode of operation) of vehicle 100 along custom route 110/115. The manner in which SI tool 250 may be implemented is described below with examples.

12. Stop Identification (SI) Tool

FIG. 11 is a block diagram illustrating the internal details of SI tool 250 in one embodiment. SI tool 250 is shown containing GPS receiver 1110, buffer 1120, communication interface 1130, data processor 1150, timer 1160, and render engine 1180. Each of the blocks is described in detail below.

GPS receiver 1110 receives GPS/location data (such as the latitude, longitude, bearing, speed, time, etc.) from one or more GPS satellites 231-232 (wirelessly) and stores the received data in buffer 1120. The received data may later be used for identifying the GPS locations corresponding to the notifications received from the users. Alternatively or in addition, GPS receiver 1110 determines location data based on a GSM/CDMA network, for example, the Cell ID information in a mobile network. The location may then be estimated based on the latitude, longitude information received as part of the GPS data or using triangulation method in the case of location data, as is well known in the arts.

It may be appreciated that though GPS receiver 1110 is shown internal to SI tool 250, in alternative embodiments, GPS receiver 1110 may be provided as an independent unit external to SI tool 250. GPS receiver 1110 may then communicate with SI tool 250 (for storing in buffer 1120) using short distance protocols such as Bluetooth. It should be further appreciated that other location aware technologies such as WiMax, RFID, etc. may also be used (either independently or in combination with GPS based methods) to estimate the location of vehicle 100 at different time instances.

Buffer 1120 represents a volatile memory (such as RAM) or a non-volatile storage (such as a hard disk) which is used to maintain one or more of user data (shown in table 400 of FIG. 4), the transit states corresponding to the notifications (shown in table 500 of FIG. 5B, table 700 of FIG. 7A and table 900 of FIG. 9B), and rendezvous point information (shown in table 600 of FIG. 6, table 800 of FIG. 8 and table 1000 of FIG. 10). Buffer 1120 is also used to maintain temporary data such as the GPS locations of the vehicle and the corresponding time instances (received from GPS receiver 1100) and the various computation tables (or corresponding data structures) used for processing the transit states (as described above).

Communication interface 1130 facilitates the sending/receiving of requests and/or responses to server system 260 and client devices 211-213 (via path 225). Communication interface 1130 receives (in the form of IP, GSM, GPRS packets) notifications from client devices 211-213 and forwards the received notifications (and corresponding time instances) to data processor 1150. Communication interface 1130 may also send an acknowledgement response to the client device (from which the notification was received).

Communication interface 1130 also retrieves (by sending appropriate requests/responses to server system 260) the data maintained in data store 280 such as user data, rendezvous point information, etc. and stores the retrieved data in buffer 1120. Communication interface 1130 further receives query/confirmation messages to be sent from data processor 1150 and forwards the query/confirmation messages to the appropriate client devices 211-213 of the users. Communication interface 1130 receives in response to the query messages, corresponding responses and forwards the received responses to data processor 1150.

Data processor 1150 is responsible for the general operation of SI tool 250, and accordingly performs the processing of notifications received from users, as described in detail above with respect to the steps of FIGS. 3A-3C. In general, data processor 1150 receives the notifications (from communication interface 1130), determines the corresponding transit states (including the GPS locations stored in buffer 1120 by GPS receiver 1110), and stores the transit states in buffer 1120 or in data store 280 (by sending appropriate requests to server system 260 via communication interface 1130). Data processor 1150 then inspects the (stored) transit states to identify the rendezvous points for the users and stores the identified rendezvous points in buffer 1120 and/or data store 280. Data processor 1150 may generate query/confirmation messages and forward them to communication interface 1130, and later process the responses received corresponding to the query messages.

Timer 1160 sends signals to data processor 1150 at regular intervals of time to enable data processor 1150 to perform the tasks described above. Data processor 1150 may determine different types and/or instances of windows based on the signals received from timer 1160.

Render engine 1180 receives information from data processor 1150 and displays the information on a display unit (not shown) associated with SI tool 250. Such display of information may enable the driver of vehicle 100 to view the details of the custom route, the notifications received, the details of identified custom rendezvous points, user data etc.

It should be appreciated that the features of alert system 250 can be implemented in various embodiments as a desired combination of one or more of hardware, software and firmware. The description is continued with respect to one embodiment in which various features are implemented using executable modules.

13. Digital Processing System

FIG. 12 is a block diagram illustrating the details of digital processing system 1200 in which various aspects of the present invention are operative by execution of appropriate executable modules in one embodiment. Digital processing system 1200 may correspond to SI tool 250, located in vehicle 100.

Digital processing system 1200 may contain one or more processors (such as a central processing unit (CPU) 1210), random access memory (RAM) 1220, secondary memory 1230, graphics controller 1260, display unit 1270, network interface 1280, and input interface 1290. All the components except display unit 1270 may communicate with each other over communication path 1250, which may contain several buses as is well known in the relevant arts. The components of FIG. 12 are described below in further detail.

CPU 1210 may execute instructions stored in RAM 1220 to provide several features of the present invention. CPU 1210 may contain multiple processing units, with each processing unit potentially being designed for a specific task. Alternatively, CPU 1210 may contain only a single general purpose processing unit. RAM 1220 may receive instructions from secondary memory 1230 using communication path 1250.

Graphics controller 1260 generates display signals (e.g., in RGB format) to display unit 1270 based on data/instructions received from CPU 1210. Display unit 1270 contains a display screen to display the images defined by the display signals. Input interface 1290 may correspond to a keyboard and a pointing device (e.g., touch-pad, mouse), which enable the various inputs to be provided. Network interface 1280 provides connectivity to a network (e.g., using Internet Protocol), and may be used to communicate with other connected systems (e.g. server system 260 and client devices 211-213) of FIG. 1. Network interface 1280 may provide connectivity over a wire (in the case of TCP/IP based communication) or wirelessly (in the case of GSM/CDMA based communication).

Secondary memory 1230 may contain hard drive 1232, flash memory 1235, and removable storage drive 1237. Secondary memory 1230 may store the data (e.g., notifications, transit states, and state of rendezvous points) and software instructions (e.g., for performing the steps of FIGS. 3A-3C), which enable digital processing system 1200 to provide several features in accordance with the present invention.

Some or all of the data and instructions may be provided on removable storage unit 1240, and the data and instructions may be read and provided by removable storage drive 1237 to CPU 1210. Floppy drive, magnetic tape drive, CD-ROM drive, DVD Drive, Flash memory, removable memory chip (PCMCIA Card, EPROM) are examples of such removable storage drive 1237. Removable storage unit 1240 may be implemented using medium and storage format compatible with removable storage drive 1237 such that removable storage drive 1237 can read the data and instructions. Thus, removable storage unit 1240 includes a computer readable storage medium having stored therein computer software and/or data. However, the computer (or machine, in general) readable storage medium can be in other forms (e.g., non-removable, random access, etc.). These "computer program products" are means for providing software to digital processing system 1200. CPU 1210 may retrieve and execute the software instructions to provide various features of the present invention described above.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of executable modules, user selections, network transactions, database queries, database structures, hardware modules/circuits, hardware chips, etc., to provide a thorough understanding of embodiments of the invention.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of identifying custom rendezvous points between users and vehicles plying on custom routes, said method being performed in a system located on a first vehicle, said method comprising:

receiving a plurality of notifications from a plurality of users while said first vehicle is in transit on a first custom route, said plurality of notifications including a first notification and a second notification respectively received from a first user and a second user of said plurality of users;

determining a plurality of transit states of said first vehicle corresponding to said plurality of notifications in response to said receiving, wherein each of said plurality of transit states corresponds to a respective one of said plurality of notifications, said plurality of transit states including a first transit state and a second transit state respectively corresponding to said first notification and said second notification, wherein each transit state in said plurality of transit states comprises all of (1) a GPS (global positioning system) location of said first vehicle at the time of said receiving of the corresponding notification, (2) a route distance indicating the distance travelled by said first vehicle on said first custom route from a start point, (3) a bearing of said first vehicle, (4) a speed of said first vehicle, and (5) a dwell time indicating the duration for which said first vehicle has been at said GPS location; and inspecting said plurality of transit states to identify a first set of custom rendezvous points for said plurality of users, wherein a first custom rendezvous point of said first set of custom rendezvous points is identified based on both of said first transit state and said second transit state, wherein said first set of custom rendezvous points facilitates said plurality of users to rendezvous with said first vehicle plying on said first custom route, wherein said first custom rendezvous point facilitates both of said first user and said second user to rendezvous with said first vehicle on said first custom route.

2. The method of claim 1, wherein said inspecting is performed using a plurality of windows, said method further comprising:

collecting a first set of transit states corresponding to notifications received within a first window of said plurality of windows, wherein said plurality of transit states comprises said first set of transit states;

determining whether there exists a first custom rendezvous point within said first window; and processing said first set of transit states according to a first manner if said determining determines that said first custom rendezvous point exists within said first window and according to a second manner otherwise.

3. The method of claim 2, wherein said first set of transit states corresponds to notifications received from a first set of users of said plurality of users, wherein said first manner comprises:

identifying that said first set of transit states are similar to the state of said first custom rendezvous point;

determining whether said first set of users are already assigned to a second custom rendezvous point, wherein said first set of users rendezvous with said first vehicle at said second custom rendezvous point;

if said determining determines that said first set of users are already assigned to said second custom rendezvous point, checking with said first set of users whether the users desire to board from said first custom rendezvous point and reassigning said first set of users to said first custom rendezvous point if the users desire to board from said first custom rendezvous point; and otherwise, assigning said first custom rendezvous point to said first set of users, wherein said first set of users rendezvous with said first vehicle at said first custom rendezvous point.

4. The method of claim 3, wherein said first manner further comprises:

identifying that said first set of transit states differ in bearing to the state of said first custom rendezvous point;

checking whether said first set of users are agreeable to rendezvous with said first vehicle at said first custom rendezvous point;

if said first set of users are agreeable to rendezvous with said first vehicle at said first custom rendezvous point, assigning said first custom rendezvous point to said first set of users, wherein said first set of users rendezvous with said first vehicle at said first custom rendezvous point; and otherwise, assigning a third custom rendezvous point to said first set of users, wherein said third custom rendezvous point is different from said first custom rendezvous point, wherein said first set of users rendezvous with said first vehicle at said third custom rendezvous point.

5. The method of claim 4, wherein said first manner further comprises:

identifying that said first set of transit states differ in route distance to the state of said first custom rendezvous point; and assigning, in response to said identifying, a fourth custom rendezvous point to said first set of users, wherein said fourth custom rendezvous point is different from said first custom rendezvous point, wherein said first set of users rendezvous with said first vehicle at said fourth custom rendezvous point.

6. The method of claim 2, wherein said first set of transit states corresponds to notifications received from a first set of users of said plurality of users, wherein said second manner comprises:

identifying that there exists a first transit state in said first set of transit states that has said speed as zero and said dwell time greater than a pre-defined duration; and assigning said GPS location of said first transit state as a second rendezvous point to said first set of users, wherein said first set of users rendezvous with said first vehicle at said second custom rendezvous point.

7. The method of claim 6, wherein said second manner further comprises:

identifying that there exists a point of interest within a pre-defined distance from each of said first set of transit states; and assigning said GPS location of said point of interest as a third rendezvous point to said first set of users, wherein said first set of users rendezvous with said first vehicle at said third custom rendezvous point.

8. The method of claim 7, wherein said second manner further comprises:

determining a location having an average distance from each of said first set of transit states; and assigning said location as a fourth rendezvous point to said first set of users, wherein said first set of users rendezvous with said first vehicle at said fourth custom rendezvous point.

9. A non-transitory machine readable medium storing one or more sequences of instructions for causing a system to identify custom rendezvous points between users and vehicles plying on custom routes, said system being located in a first vehicle, wherein execution of said one or more sequences of instructions by said one or more processors in said system causes said system to perform the actions of:

receiving a plurality of notifications from a plurality of users while said first vehicle is in transit on a first custom route, said plurality of notifications including a first notification and a second notification respectively received from a first user and a second user of said plurality of users;

determining a plurality of transit states of said first vehicle corresponding to said plurality of notifications in response to said receiving, wherein each of said plurality of transit states corresponds to a respective one of said plurality of notifications, said plurality of transit states including a first transit state and a second transit state respectively corresponding to said first notification and said second notification, wherein each transit state in said plurality of transit states comprises all of (1) a GPS (global positioning system) location of said first vehicle at the time of said receiving of the corresponding notification, (2) a route distance indicating the distance travelled by said first vehicle on said first custom route from a start point, (3) a bearing of said first vehicle, (4) a speed of said first vehicle, and (5) a dwell time indicating the duration for which said first vehicle has been at said GPS location; and inspecting said plurality of transit states to identify a first set of custom rendezvous points for said plurality of users, wherein a first custom rendezvous point of said first set of custom rendezvous points is identified based on both of said first transit state and said second transit state, wherein said first set of custom rendezvous points facilitates said plurality of users to rendezvous with said first vehicle plying on said first custom route, wherein said first custom rendezvous point facilitates both of said first user and said second user to rendezvous with said first vehicle on said first custom route.

10. The non-transitory machine readable medium of claim 9, wherein said inspecting is performed using a plurality of windows, further comprising one or more instructions for:

collecting a first set of transit states corresponding to notifications received within a first window of said plurality of windows, wherein said plurality of transit states comprises said first set of transit states;

determining whether there exists a first custom rendezvous point within said first window; and processing said first set of transit states according to a first manner if said determining determines that said first custom rendezvous point exists within said first window and according to a second manner otherwise.

11. The non-transitory machine readable medium of claim 10, wherein said first set of transit states corresponds to notifications received from a first set of users of said plurality of users, wherein said first manner comprises performing the actions of:

identifying that said first set of transit states are similar to the state of said first custom rendezvous point;

determining whether said first set of users are already assigned to a second custom rendezvous point, wherein said first set of users rendezvous with said first vehicle at said second custom rendezvous point;

if said determining determines that said first set of users are already assigned to said second custom rendezvous point, checking with said first set of users whether the users desire to board from said first custom rendezvous point and reassigning said first set of users to said first custom rendezvous point if the users desire to board from said first custom rendezvous point; and otherwise, assigning said first custom rendezvous point to said first set of users, wherein said first set of users rendezvous with said first vehicle at said first custom rendezvous point.

12. The non-transitory machine readable medium of claim 11, wherein said first manner further comprises performing the actions of:

identifying that said first set of transit states differ in bearing to the state of said first custom rendezvous point;

checking whether said first set of users are agreeable to rendezvous with said first vehicle at said first custom rendezvous point;

if said first set of users are agreeable to rendezvous with said first vehicle at said first custom rendezvous point, assigning said first custom rendezvous point to said first set of users, wherein said first set of users rendezvous with said first vehicle at said first custom rendezvous point; and otherwise, assigning a third custom rendezvous point to said first set of users, wherein said third custom rendezvous point is different from said first custom rendezvous point, wherein said first set of users rendezvous with said first vehicle at said third custom rendezvous point.

13. The non-transitory machine readable medium of claim 12, wherein said first manner further comprises performing the actions of:

identifying that said first set of transit states differ in route distance to the state of said first custom rendezvous point; and assigning, in response to said identifying, a fourth custom rendezvous point to said first set of users, wherein said fourth custom rendezvous point is different from said first custom rendezvous point, wherein said first set of users rendezvous with said first vehicle at said fourth custom rendezvous point.

14. The non-transitory machine readable medium of claim 10, wherein said first set of transit states corresponds to notifications received from a first set of users of said plurality of users, wherein said second manner comprises performing the actions of:

identifying that there exists a first transit state in said first set of transit states that has said speed as zero and said dwell time greater than a pre-defined duration; and assigning said GPS location of said first transit state as a second rendezvous point to said first set of users, wherein said first set of users rendezvous with said first vehicle at said second custom rendezvous point.

15. The non-transitory machine readable medium of claim 14, wherein said second manner further comprises performing the actions of:

identifying that there exists a point of interest within a pre-defined distance from each of said first set of transit states; and assigning said GPS location of said point of interest as a third rendezvous point to said first set of users, wherein said first set of users rendezvous with said first vehicle at said third custom rendezvous point.

16. The non-transitory machine readable medium of claim 15, wherein said second manner further comprises performing the actions of:

determining a location having an average distance from each of said first set of transit states; and assigning said location as a fourth rendezvous point to said first set of users, wherein said first set of users rendezvous with said first vehicle at said fourth custom rendezvous point.

17. A computing system comprising:

a plurality of mobile devices that enables a plurality of users to send a plurality of notifications to a first vehicle in transit on a first custom route; and a system located in said first vehicle operable to:
  receive said plurality of notifications from said plurality of mobile devices, said plurality of notifications including a first notification and a second notification respectively received from a first user and a second user of said plurality of users;
  determine a plurality of transit states of said first vehicle corresponding to said plurality of notification in response to said receive, wherein each of said plurality of transit states corresponds to a respective one of said plurality of notifications, said plurality of transit states including a first transit state and a second transit state respectively corresponding to said first notification and said second notification,
  wherein each transit state in said plurality of transit states comprises all of (1) a GPS (global positioning system) location of said first vehicle at the time of said receiving of the corresponding notification, (2) a route distance indicating the distance travelled by said first vehicle on said first custom route from a start point, (3) a bearing of said first vehicle, (4) a speed of said first vehicle, and (5) a dwell time indicating the duration for which said first vehicle has been at said GPS location; and
  inspect said plurality of transit states to identify a first set of custom rendezvous points for said plurality of users, wherein a first custom rendezvous point of said first set of custom rendezvous points is identified based on both of said first transit state and said second transit state,
  wherein said first set of custom rendezvous points facilitates said plurality of users to rendezvous with said first vehicle plying on said first custom route, wherein said first custom rendezvous point facilitates both of said first user and said second user to rendezvous with said first vehicle on said first custom route.

* * * * *